(12) United States Patent
Rijckaert

(10) Patent No.: US 6,418,269 B1
(45) Date of Patent: *Jul. 9, 2002

(54) RECORDING OF TRICK PLAY SIGNALS ON A RECORD CARRIER

(75) Inventor: Albert M. A. Rijckaert, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 09/756,691

(22) Filed: Jan. 9, 2001

Related U.S. Application Data

(63) Continuation of application No. 09/155,748, filed as application No. PCT/IB98/00131 on Feb. 2, 1998, now Pat. No. 6,222,981.

(30) Foreign Application Priority Data

Feb. 6, 1939 (GB) ............................................. 97200278
Nov. 12, 1997 (GB) ............................................. 97203515

(51) Int. Cl.[7] .............................................. H04N 5/783
(52) U.S. Cl. ........................................... 386/68; 386/81
(58) Field of Search ............................ 386/46, 68, 80, 386/81, 82, 112; 360/32

(56) References Cited

U.S. PATENT DOCUMENTS

| 5,142,421 A | 8/1992 | Kahlman et al. | ............. 360/40 |
|---|---|---|---|
| 5,579,183 A | 11/1996 | Van Gestel et al. | ........... 360/48 |
| 5,751,889 A | 5/1998 | Van Gestel et al. | ........... 386/68 |
| 5,859,949 A * | 1/1999 | Yanagihara | ................... 368/68 |
| 5,953,483 A | 9/1999 | Van Gestel et al. | ........... 386/65 |
| 6,026,213 A | 2/2000 | Higurashi et al. | ............. 386/68 |
| 6,141,486 A * | 10/2000 | Lane et al. | .................... 386/68 |

FOREIGN PATENT DOCUMENTS

| EP | 0735781 | 10/1996 | .......... H04N/9/804 |
|---|---|---|---|
| WO | WO9528061 | 10/1995 | .......... H04N/9/804 |
| WO | WO9630905 | 10/1996 | .......... G11B/20/10 |

* cited by examiner

*Primary Examiner*—Huy Nguyen
(74) *Attorney, Agent, or Firm*—Edward W. Goodman

(57) ABSTRACT

A format for the recording of trick play signals in which trick play segments, having sync blocks of information of a trick play signal, are recorded in groups of p successive tracks. At least first and second trick play signals are recorded on the record carrier. The first trick play signal is meant for reproduction in a reproduction apparatus at a reproduction speed $n_1$ times the recording speed with which the trick play signals are recorded on the record carrier. The second trick play signal is meant for reproduction in the reproduction apparatus at a reproduction speed $n_2$ times the recording speed. Both trick play signals are recorded such that upon reproduction at the speed $n_1$ times the recording speed, $m_1$ sync blocks of information of the first trick play signal and $m_1$ sync blocks of the second trick play signal are read from the record carrier during one revolution of the head drum in the reproduction apparatus.

1 Claim, 16 Drawing Sheets

RECORDING OF TRICK PLAY SIGNALS ON A RECORD CARRIER

CROSS-REFERENCE TO RELATED APPLICATIONS

This is a continuation application of U.S. patent application Ser. No. 09/155,748, filed Oct. 5, 1998 U.S. Pat. No. 6,222,981 which is a 371 of PCT/IB98/00131 filed Feb. 2, 1998.

BACKGROUND OF THE INVENTION

1. Field of the Invention

The invention relates to an apparatus for recording a first and a second digital information signal in slant tracks on a magnetic record carrier, the apparatus comprising input means for receiving the first and second digital information signals, signal processing means for processing the first and second digital signals into first and second trick play signals, respectively, suitable for recording in the tracks, writing means for writing, at a recording speed of the record carrier, the first and second trick play signals so as to obtain trick play segments located at specific positions in said tracks, the writing means comprising at least a first and a second write head located on a rotatable head drum, the first write head having a gap with a first azimuth angle, and the second write head having a gap with a second azimuth angle which is different from the first azimuth angle, the first digital information signal being meant for enabling a replay in a reproduction apparatus at a trick play reproduction speed which equals $n_1$ times the recording speed, the second digital information signal being meant for enabling a replay in said reproduction apparatus at a trick play reproduction speed which equals $n_2$ times the recording speed, where $n_1$ and $n_2$ are integers unequal to each other and unequal to 0 and 1.

2. Description of the Related Art

Such a recording apparatus is known from U.S. Pat. No. 5,751,889, corresponding to International Application WO 95/28061, document D4 in the list of documents. The known apparatus takes the form of a digital video recorder for recording a digital video signal. The digital video signal may be in the form of an MPEG-encoded video signal, in which packets of information of the digital video signal are included in the serial data stream of the MPEG-encoded video signal. In addition to such MPEG encoded video signal, a trick play signal can be recorded in the tracks on the record carrier. Such trick play signal can be the same video signal, but reproduced at a record carrier (trick play) speed which is other than the nominal reproduction speed. Generally, a separate datastream is recorded as the trick play signal on the record carrier for enabling the reproduction at such trick play speed. The trick play signal can be derived from the MPEG-encoded video signal, e.g. by selecting I-frames from the MPEG-encoded video signal.

This trick play signal, however, need not necessarily be a trick play signal that has a relationship with the MPEG-encoded video signal, but can be a completely different signal. But, in the same way as the MPEG-encoded digital video signal, the serial datastream of the trick play signal comprises packets of information of the trick play signal.

The document mentioned above describes the recording of segments of information of a plurality of trick play signals in the tracks on a record carrier. The segments of a specific trick play signal have a specific position in the tracks in order to enable reproduction of the trick play signal at its corresponding trick play reproduction speed.

SUMMARY OF THE INVENTION

It is an object of the invention to propose an improved recording apparatus for recording a plurality of trick play signals in accordance with a specific format on the record carrier.

The recording apparatus in accordance with the invention is characterized in that the first and second trick play signals comprise sync blocks of information of the first and second digital information signals, respectively, and that the writing means are adapted to write the sync blocks of the first trick play signal into first trick play segments, and to write the sync blocks of the second trick play signal into second trick play segments, so as to enable, during reproduction at a trick play speed $n_1$ times the recording speed in said reproduction apparatus, which is provided with reading means for reading the first and second trick play segments, said reading means comprising at least a first and a second read head located on a rotatable head drum, said first read head having a gap with an azimuth angle substantially equal to said first azimuth angle, and the second read head having a gap with an azimuth angle substantially equal to said second azimuth angle, the reading of $m_1$ sync blocks of the first trick play signal from first trick play segments during one revolution of the head drum and so as to enable, during reproduction at said trick play speed $n_2$ times the recording speed, and the reading of $m_1$ sync blocks of the second trick play signal from second trick play segments during one revolution of the rotatable head drum, where $m_1$ is an integer larger than 1.

The invention is based on the recognition that in this way, the same number of sync blocks can be read for at least two different trick play reproduction modes, such as, the trick play reproduction modes with a certain speed larger than the recording speed, and in the forward and backwards direction. The invention enables further measures to be taken so that various other advantages can be obtained, such as, a very robust reproduction in a trick play reproduction mode, namely, by optimally positioning the trick play segments along scanning lines of the read heads. An optimal robustness against tracking errors and missing sync blocks can be obtained. Further, an optimal detection of subcode information stored in a subcode area can be realized.

BRIEF DESCRIPTION OF THE DRAWINGS

These and other aspects of the invention will be apparent from and elucidated with reference to the embodiments described hereafter in the drawings, in which.

DESCRIPTION OF THE PREFERRED EMBODIMENTS

Figure 1:
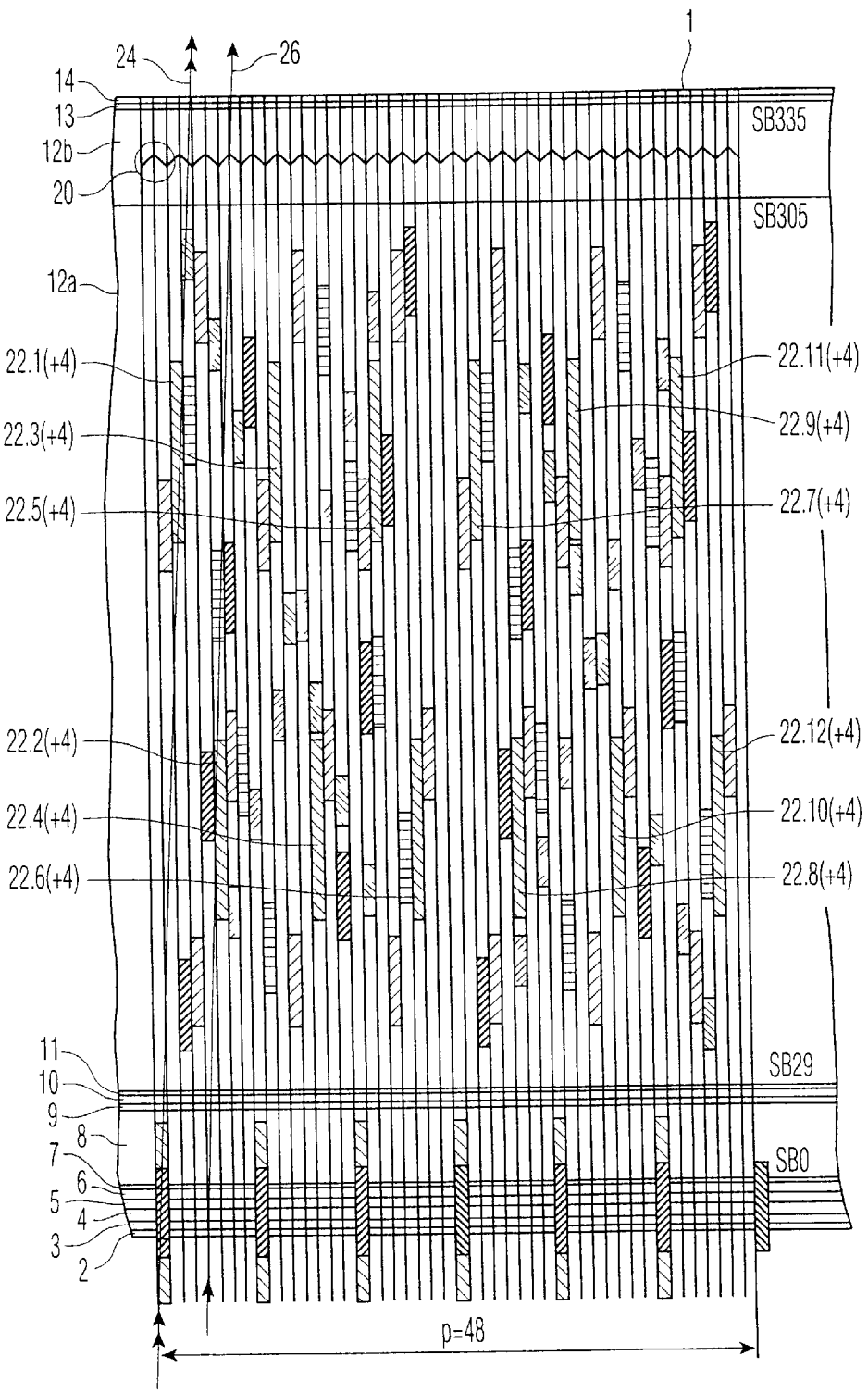
FIG. 1 shows the track format in a group of p tracks, where p equals 48, and the paths across the record carrier that two reproduction heads follow during a first trick play reproduction mode, where the record carrier speed is +4 times nominal.

FIG. 1 shows the track format of the tracks recorded on the record carrier 1. The tracks are recorded at a slant angle with reference to the longitudinal direction of the record carrier. In FIG. 1, however, the tracks are shown, for clarity reasons, at an angle transverse to the longitudinal direction of the record carrier 1. Groups of p successive tracks can be identified on the record carrier 1. One such group of p successive tracks is shown in FIG. 1, where p is, in the present example, equal to 48. During recording/reproduction, the tracks are written/read in a direction from the bottom to the top of FIG. 1 and from left to right in the figure.

Having subsequent groups of 48 tracks, the following dividends are possible as trick play speeds: 2×, 3×, 4×, 6×, 8×, 12× and 24×. The lowest two trick play speeds require a large amount of trick play data. Further, it is preferred to select trick play speeds that are integer multiples of each other. That results in either the trick play speeds 4×, 12× and 24×, or 6×, 12 and 24×. In the following, the set of trick play speeds 4×, 12× and 24×, and their reverse speeds will be further discussed.

Figure 2:
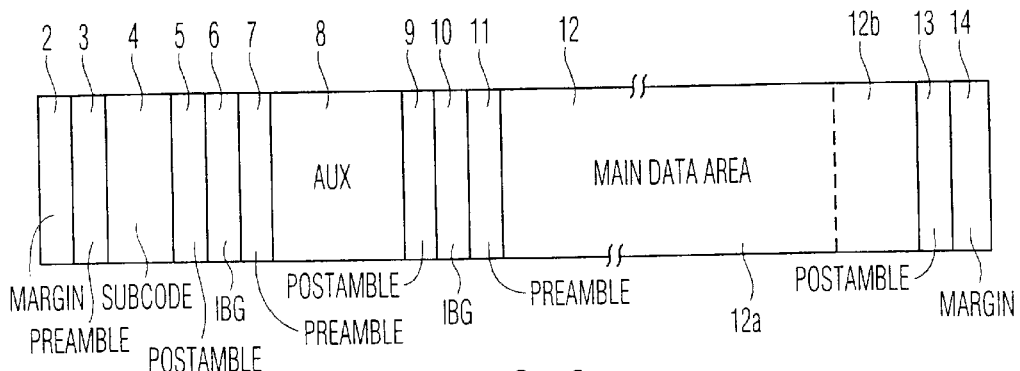
FIG. 2 shows the contents of a track on the record carrier.

FIG. 2 shows the format of one track. The track is recorded and read in a direction from left to right in the figure. In the present example, the lengths of the various track portions in FIG. 2 are expressed in number of main sync blocks, where a main sync block has a length of 112 bytes of 8 bits each.

First, a clock run-in portion 2, denoted 'margin', is recorded, which in the present example, is 2 main sync blocks long. Next, a preamble portion 3 which is 3 main sync blocks long. A subcode signal recording portion 4 follows the preamble portion 3 and is 4 main sync blocks long. The subcode signal recording portion 4 is meant to contain a subcode signal. The subcode signal can comprise, among others, absolute and/or relative time information and a table of contents.

Next, a postamble portion 5 which is 3 main sync blocks long, an edit gap 6, denoted 'IBG', which is 3 main sync blocks long and a preamble portion 7, which is, in the present example, 1 main sync block long. Next, an auxiliary signal recording portion 8, denoted 'AUX', follows which is 23 main sync blocks long. The aux signal recording portion 8 is meant for recording an auxiliary signal, such as text data, as an example. This aux signal recording portion 8 is followed by a postamble portion 9, which is 2 main sync blocks long, an edit gap 10, denoted 'IBG', which is 3 main sync blocks long and a preamble portion 11, which is 1 main sync block long. Next an information signal recording portion 12, denoted 'main data area', follows which is 307 main sync blocks long. The information signal recording portion 12 is meant to record the digital information signals in. One digital information signal can be a digital video signal and/or a digital audio signal, which may have been encoded into an MPEG information signal. Further, trick play data can be included in the information signal recording portion 12. The information signal recording portion 12 is fictively divided into two parts, a first part 12a which is 277 main sync blocks long and a second part 12b, which is 30 main sync blocks long. The second part 12b comprises outer ECC parity information.

The information signal recording portion 12 is followed by a postamble portion 13, which is 2 main sync blocks long, and another 'margin' portion 14, the length of 30 which is not relevant, but can be assumed to be 2 main sync blocks long, for the present example. In total, the track thus comprises 356 main sync blocks.

It should be noted here, that the auxiliary signal recording portion 8 may be optional, in the sense that in another recording mode, no auxiliary signal is recorded in the tracks and the recording portion 8, including the portions 9, 10 and 11, are added to the information signal recording portion 12 and are filled with main information. In this other mode, however, no trick play data will be recorded in the portion of the track otherwise occupied by the portions 8, 9, 10 and 11.

Coming back to FIG. 1, the contents of the first part 12a of the information signal recording portion 12 will be further described. FIG. 1 shows tracks that have been recorded using at least a first and a second write head. The first write head has a gap with a first azimuth angle, and the second write head has a gap with a second azimuth angle, which is different from the first azimuth angle. The tracks recorded by the first write head having the first azimuth angle are indicated by the slant line running from the bottom left corner of the figure, to the top right corner of the figure and the tracks recorded by the second write head having the second azimuth angle are indicated by the slant line running from the bottom right corner of the figure to the top left corner of the figure, see the circle in FIG. 1 having the reference numeral 20.

A first information signal, which may comprise packets of information of an MPEG transport stream, is recorded in the tracks, more specifically, in the information signal recording portion 12 of the tracks. In an embodiment of the recording apparatus, which is in the form of a digital videorecorder of the helical scan type, the first information signal could be 'normal play' data recorded in the tracks for reproduction in a reproducing apparatus at a record carrier speed which is the same as the record carrier speed during recording. This speed is defined as the nominal record carrier speed. The first information signal is accommodated in the main sync blocks, defined above.

Further, a second information signal has been recorded in specific segments in the tracks. Those segments are indicated in FIG. 1 by reference numerals 22.i(+4), where i runs from 1 to 12. This second information signal is meant for a reproduction in a reproduction apparatus at a reproduction speed which is 4 times the nominal reproduction in the forward direction. This second information signal could be an information signal which has no relationship whatsoever with the first information signal introduced above. Alternatively, the second information signal could have a relationship with the first information signal, in the sense that the second information signal is a trick play signal (defined from now on as the first trick play signal) for the 4 times nominal reproduction speed, in order to obtain a reproduced (video) signal, which is a replica of the reproduced first (video) signal, but reproduced at four times the nominal speed in the forward direction.

Figure 1A:
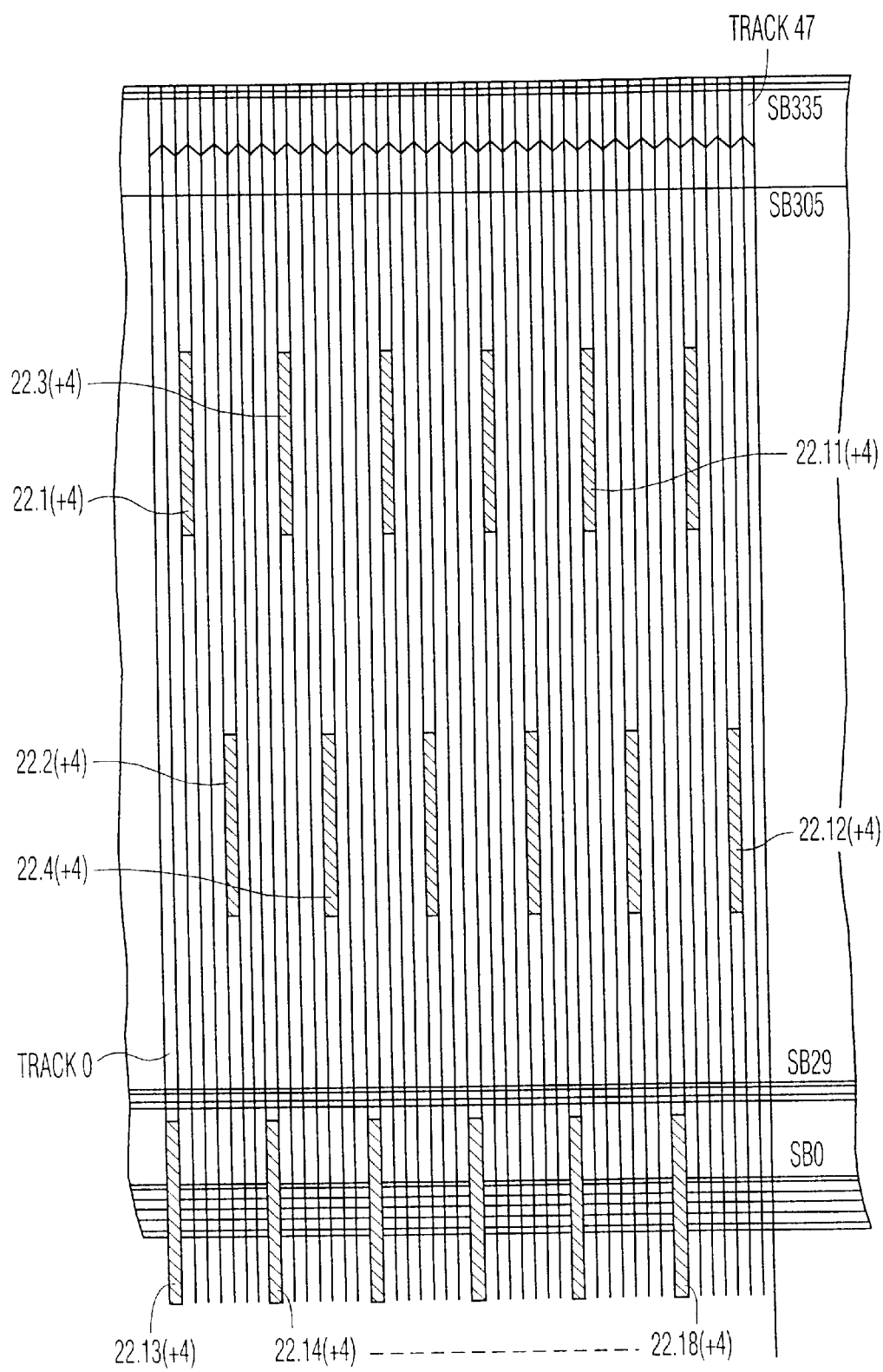
FIG. 1a shows the trick play segments for the +4 times nominal reproduction mode only, in the group of 48 tracks.

FIG. 1a shows the same group of 48 tracks as FIG. 1, however, only the 12 segments 22.i(+4) are shown in FIG. 1a. Assuming the track number of the first track in the group of 48 tracks to be track no. 0 and the track number of the last track in the group to be track number 47, the segments are recorded in the tracks with track number 2+n.8 and 5+n.8, where n is an integer running from 0 to 5 inclusive.

FIG. 1 further shows two scanning lines 24 and 26. The double arrowed scanning line 24 shows the path that the one read head, having the first azimuth angle, follows across the record carrier in the four times nominal reproduction mode, during one revolution of the head drum. The single arrowed scanning line 26 shows the path that the other read head, having the second azimuth angle, follows across the record carrier in the four times nominal reproduction mode during the said one revolution of the head drum. As can be seen in FIG. 1, the one read head reads the trick play segments 22.i(+4), where i is odd, and the other read head thus reads the trick play segments 22.i(+4), where i is even.

The trick play segments 22.i(+4) each have a length of ($m_1/2=$) 56 main sync blocks, in the present example. From the 56 main sync blocks in one segment, 51 sync blocks have information contents as regards the trick play information stored in those sync blocks. The other five sync blocks in a segment comprise parity information, obtained from an ECC encoding step carried out on the trick play information. Thus, during each revolution of the head drum, during a four times nominal reproduction mode, 112 sync blocks of information of the first trick play signal, which include 10 sync blocks comprising parity information are read from the record carrier. The parity sync blocks in a trick play segment are preferably stored last in a trick play segment.

When numbering the main sync blocks in a track, starting from 0, which is the first sync block in the aux recording area 8 in the track, until 305, which is the last sync block in the area 12a of the track, the sync blocks in the segments 22.i(+4), where i is even, are the sync blocks numbered 82 to 137 inclusive in a track, where the sync blocks numbered 133 to 137 inclusive are the sync blocks comprising the parity information. Further, the sync blocks in the segments 22.i(+4), where i is odd, are the sync blocks numbered 200 to 255 inclusive in a track, where, again, the sync blocks numbered 251 to 255 inclusive are the sync blocks comprising the parity information. It should be noted here, that what is called here as 'sync block numbers' for the trick play sync blocks, those numbers are numbers different from what is later called and described as 'trick play sync block numbers' for the same trick play sync blocks.

FIG. 1a further shows portions, numbered 22.13(+4) to 22.18(+4), located at the lower edge of some of the tracks in the group of 48 tracks. Those locations are locations that can be read in the +4 times nominal reproduction mode by one of the two read read heads, in the present case, the head having the first azimuth. As the locations shown include the subcode signal recording portion, it is possible to read the information in the subcode signal recording portion, also in the +4 times nominal reproduction mode.

Figure 3:
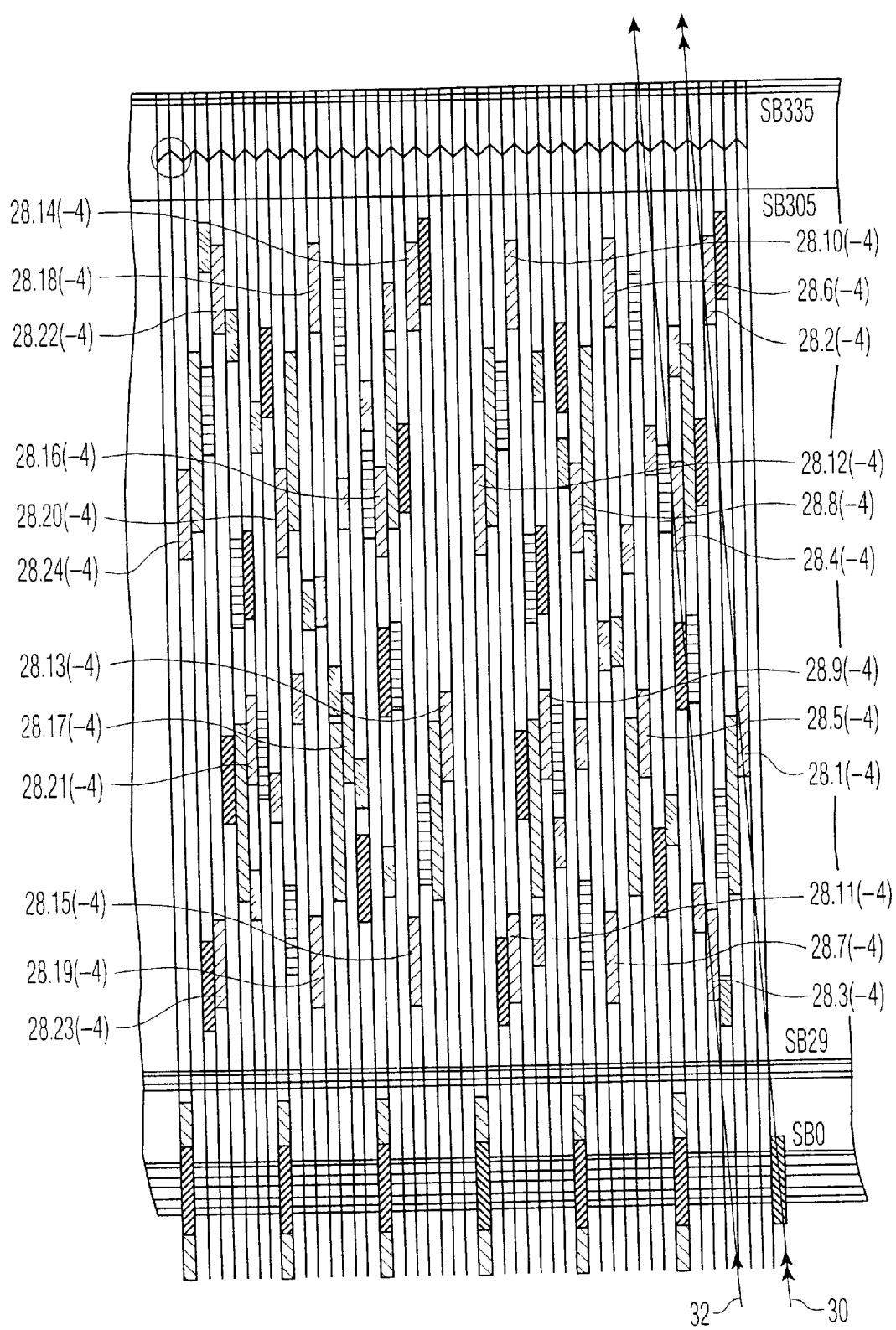
FIG. 3 shows the same format as FIG. 1, with the paths across the record carrier that the two reproduction heads follow during a second trick play reproduction mode, where the record carrier speed is −4 times nominal.

FIG. 3 shows a third information signal (from now on called: the second trick play signal) being recorded in specific segments in the tracks. Those segments are indicated in FIG. 3 by reference numerals 28.i(−4), where i runs from 1 to 24. This second trick play signal is meant for a reproduction in a reproduction apparatus at a reproduction speed which is 4 times the nominal reproduction speed in the backwards direction. This second trick play signal could be an information signal which has no relationship whatsoever with the signals introduced above. Alternatively, the second trick play signal could have a relationship with the first information signal, in the sense that the second trick play signal is a trick play signal for the minus 4 times nominal reproduction speed, in order to obtain a reproduced (video) signal, which is a replica of the reproduced first (video) signal, but reproduced at minus four times the nominal speed (in the backwards direction).

Figure 3A:
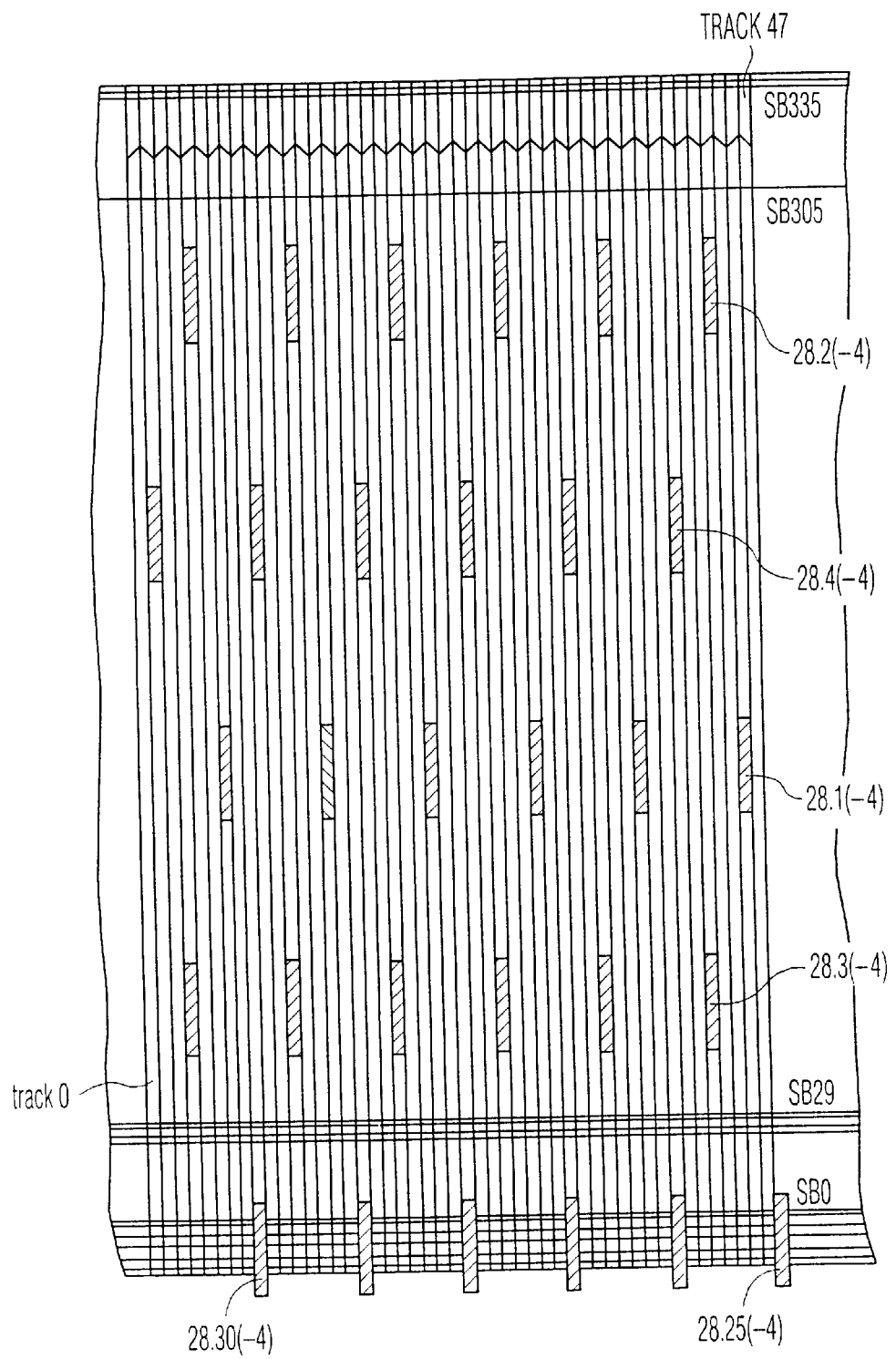
FIG. 3a shows the trick play segments for the −4 times nominal reproduction mode only, in the group of 48 tracks.

FIG. 3a shows the same group of 48 tracks as FIG. 3, however, only the 24 segments 28.i(−4) are shown in FIG. 3a. Assuming the track number of the first tack in the group of 48 tracks to be track no. 0, and the track number of the last track in the group to be track number 47, the segments are recorded in the tracks with track number 1+n.8, 3+n.8, 4+n.8 and 6+n.8, where n is an integer running from 0 to 5 inclusive.

FIG. 3 further shows two scanning lines 30 and 32. The double arrowed scanning line 30 shows the path that the one read head, having the first azimuth angle, follows across the record carrier in the minus four times nominal reproduction mode, during one revolution of the head drum. The single arrowed scanning line 32 shows the path that the other read head, having the second azimuth angle, follows across the record carrier in the minus four times nominal reproduction mode during the said one revolution of the head drum. As can be seen in FIG. 3, the one read head reads the trick play segments 28.i(−4), where i equals 3, 4, 7, 8, 11, 12, 15, 16, 19, 20, 23 and 24, and the other read head thus reads the trick play segments 28.j(−4), where j equals 1, 2, 5, 6, 9, 10, 13, 14, 17, 18, 21 and 22.

The trick play segments 28.i(−4) each have a length of ($m_1/4=$) 28 main sync blocks, as $m_1=112$. A trick play segment for the minus four times trick play speed comprise either 26 sync blocks having information contents as regards the trick play information stored in those sync blocks, and two sync blocks of parity information, or 25 sync blocks having each information contents as regards the trick play information stored in those sync blocks, and three sync blocks of parity information. Again, the parity information stored in the sync blocks comprising the parity information is obtained from an ECC encoding step carried out on the trick play signal. The parity sync blocks in a trick play segment are preferably stored last in a trick play segment.

The trick play segments for the minus 4 times nominal reproduction speed can be read as explained in the following example. When numbering the main sync blocks, starting from 0, which is the first sync block in the aux recording area 8 in a track until 305, which is the last sync block in the area 12a in the track, the sync blocks in the segments 28.i(−4), where i equals 1, 5, 9, 13, 17 and 21, are the sync blocks numbered 119 to 146 inclusive in a track, where the sync blocks numbered 145 and 146 are the sync blocks comprising the parity information. Further, the sync blocks in the segments 28.j(−4), where j equals 2, 6, 10, 14, 18, and 22, are the sync blocks numbered 262 to 289 inclusive in a track, where the sync blocks numbered 287, 288 and 289 are the sync blocks comprising the parity information. The sync blocks in the segments 28.k(−4), where k equals 3, 7, 11, 15, 19 and 23, are the sync blocks numbered 48 to 75 inclusive in a track, where the sync blocks numbered 74 and 75 are the sync blocks comprising the parity information. Further, the sync blocks in the segments 28.l(−4), where l equals 4, 8, 12, 16, 20, and 24, are the sync blocks numbered 191 to 218 inclusive in a track, where the sync blocks numbered 216, 217 and 218 are the sync blocks comprising the parity information.

Thus, during each revolution of the head drum, during a minus four times nominal reproduction mode, 112 sync blocks of information of the third information signal, 2×(26+2)+2×(25+3), are read from the record carrier, among which are 10 parity sync blocks. This is, the same number of trick play sync blocks as for the 4 times reproduction mode.

FIG. 3a further shows portions, numbered 28.25(−4) to 28.30(−4), located at the lower edge of some of the tracks in the group of 48 tracks. Those locations are locations that can be read in the −4 times nominal reproduction mode by one of the two read heads, in the present case, the read head having the first azimuth. As the locations shown include the subcode signal recording portion, it is possible to read the information in the subcode signal recording portion, also in the −4 times nominal reproduction mode.

Figure 4:
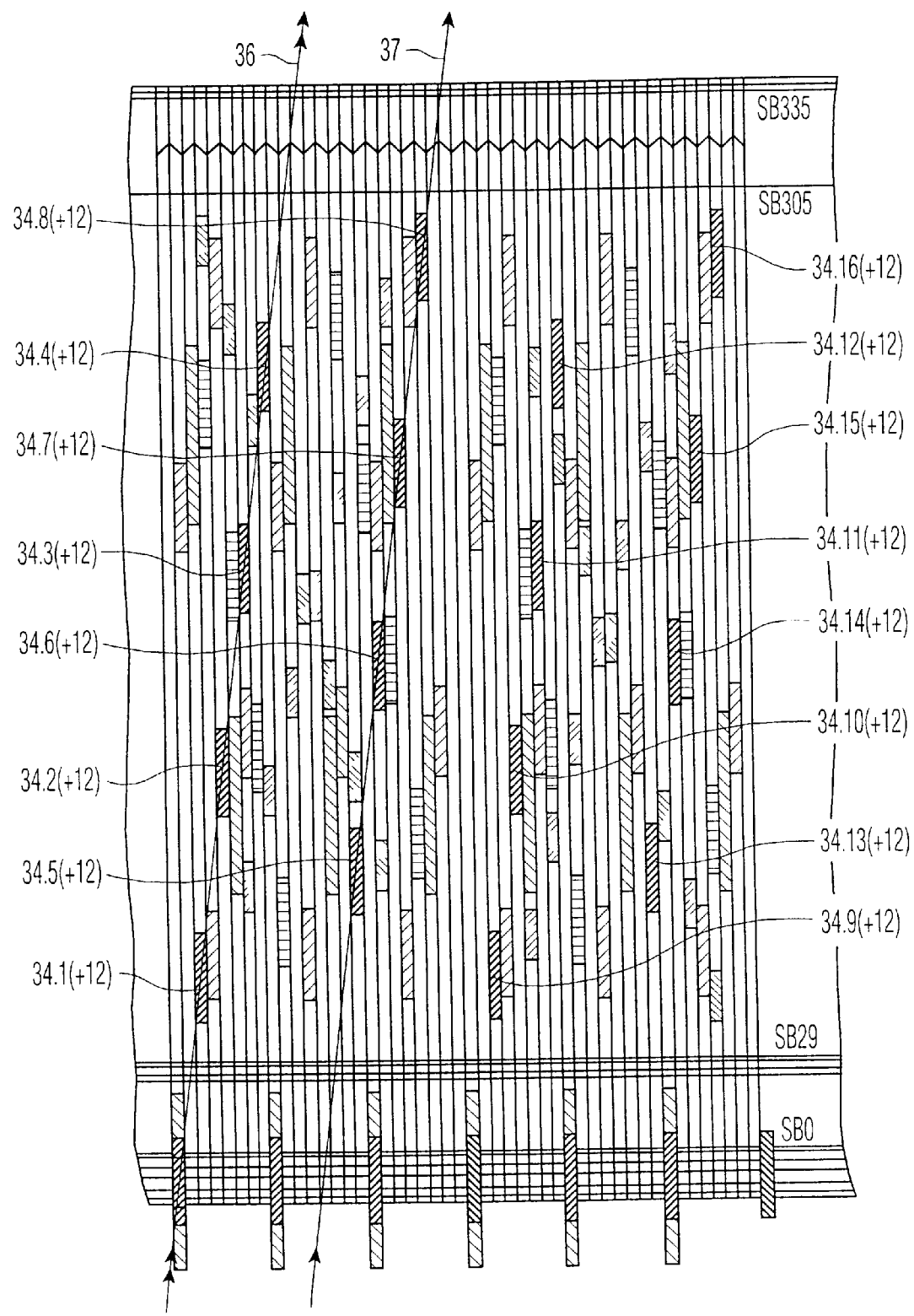
FIG. 4 shows the same format as FIG. 1, with the paths across the record carrier that the two reproduction heads follow during a third trick play reproduction mode, where the record carrier speed is +12 times nominal.

FIG. 4 shows a fourth information signal, which will be called the third trick play signal hereafter, being recorded in specific segments in the tracks. Those segments are indicated FIG. 4 by reference numerals 34.i(+12), where i runs from 1 to 16. This third trick play signal is meant for a reproduction in a reproduction apparatus at a reproduction speed which is 12 times the nominal reproduction speed in the forward direction. This third trick play signal could be an information signal which has no relationship whatsoever with the signals introduced above. Alternatively, the third trick play signal could have a relationship with the first information signal, in the sense that the third trick play signal is a trick play signal for the 12 times nominal reproduction speed in the forward direction, in order to obtain a reproduced (video) signal, which is a replica of the reproduced first (video) signal, but reproduced at 12 times the nominal speed (in the forward direction).

Figure 4A:
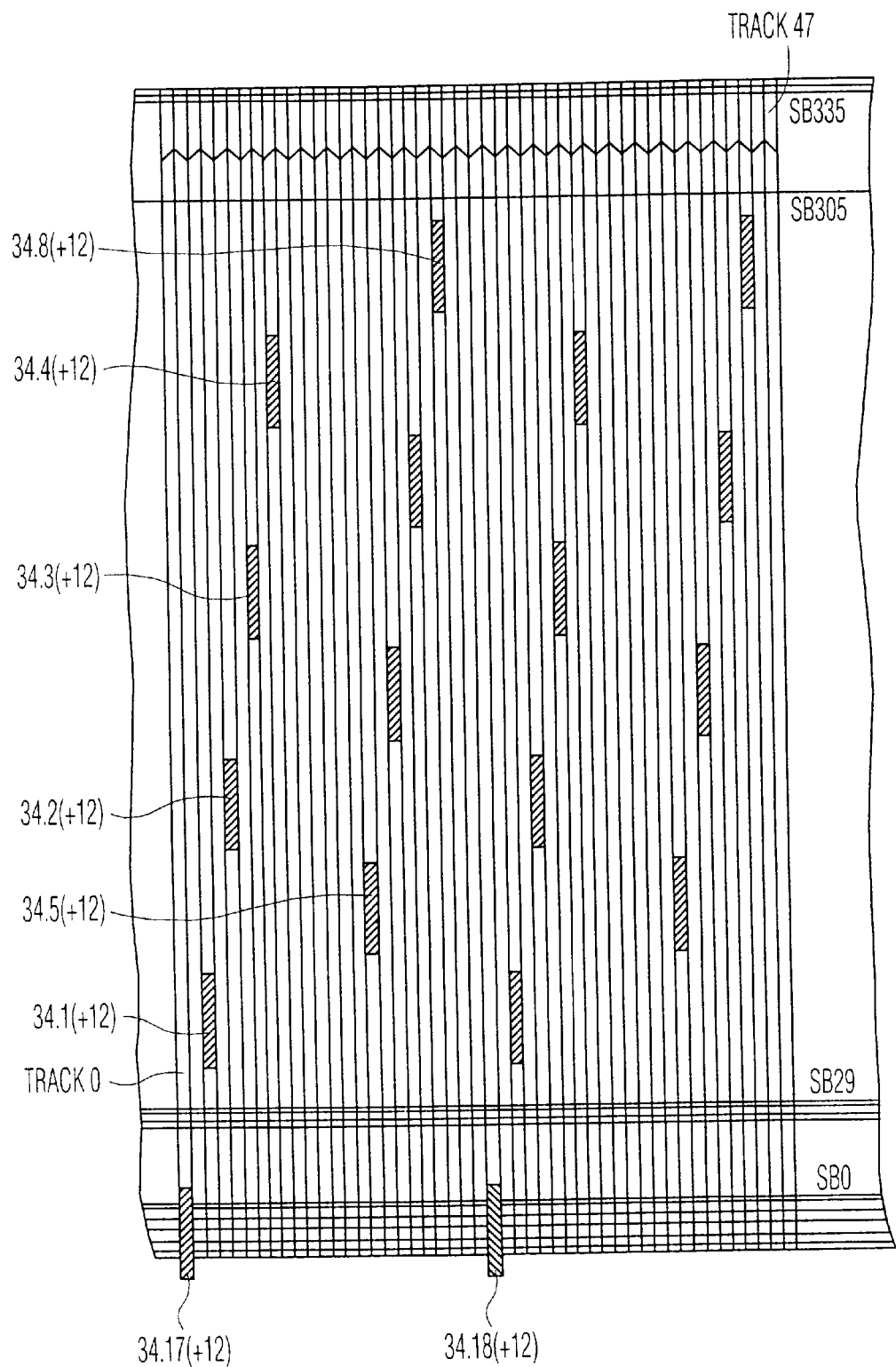
FIG. 4a shows the trick play segments for the +12 times nominal reproduction mode only, in the group of 48 tracks.

FIG. 4a shows the same group of 48 tracks as FIG. 4, however, only the 16 segments 34.i(+12) are shown in FIG. 4a. Assuming the track number of the first track in the group of 48 tracks to be track no. 0, and the track number of the last track in the group to be track number 47, the segments are recorded in the tracks with track number 2+n.2, 15+n.2, 26+n.2 and 39+n.2, where n is an integer running from 0 to 3 inclusive.

FIG. 4 further shows two scanning lines 36 and 37. The double arrowed scanning line 36 shows the path that the one read head, having the first azimuth angle, follow across the record carrier in the +12 times nominal reproduction mode, during one revolution of the head drum. The single arrowed scanning line 37 shows the path that the other read head, having the second azimuth angle, follows across the record carrier in the +12 times nominal reproduction mode during the said one revolution of the head drum. As can be seen in FIG. 4, the one head reads the trick play segments 34.i(+12), where i equals 1 to 4 inclusive and 9 to 12 inclusive, and the other read head thus reads the trick play segments 34.j(+12), where j equals 5 to 8 inclusive and 13 to 16 inclusive.

The trick play segments 34.i(+12) have a length of ($m_2/8=$) 28 main sync blocks, as $m_2=224$ in the present example. Each trick play segment comprises $m_2/16$ trick play sync blocks and repetitions of those $m_2/16$ trick play sync blocks, resulting in the $m_2/8$ sync blocks in each trick play segment.

In a group of 8 trick play segments read during one revolution of the head drum, six of them comprise two parity sync blocks per segment, and the other two segments comprise 4 sync blocks per segment. Those six segments thus each comprises 13 trick play sync blocks comprising information of the third trick play signal, 13 repetitions of those 13 trick play sync blocks, one parity sync block and one repetition of this parity sync block. Those two remaining segments thus each comprises 12 trick play sync blocks comprising information of the third trick play signal, 12 repetitions of those 12 trick play sync blocks, two parity sync blocks and repetitions of those parity sync blocks.

The trick play segments for the +12 times nominal reproduction speed can be realized as explained in the following example. When, again, numbering the main sync blocks, starting from 0, which is the first sync block in the aux recording area 8 in a track, until 305, which is the last sync block in the area 12a in the track, the trick play sync blocks in the segments 34.1(+12) and 34.9(+12) are the sync blocks numbered 41 to 68 inclusive in a track, where the sync blocks numbered 55 to 68 inclusive are repetitions of the sync blocks numbered 41 to 54 inclusive. Further, the trick play sync blocks in the segments 34.1(+12) and 34.9(+12) numbered 54 and 68 are the parity sync blocks. The trick play sync blocks in the segments 34.2(+12) and 34.10(+12) are the sync blocks numbered 106 to 133 inclusive, where the sync blocks numbered 120 to 133 inclusive are repetitions of the sync blocks numbered 106 to 119 inclusive. The trick play sync blocks numbered 119 and 133 are the parity sync blocks in the segments. The trick play sync blocks in the segments 34.3(+12) and 34.11(+12) are the sync blocks numbered 171 to 198 inclusive in a track, where the sync blocks numbered 185 to 198 inclusive are repetitions of the sync blocks numbered 171 to 184 inclusive. The trick play sync blocks numbered 184 and 198 are the parity sync blocks.

Further, the trick play sync blocks in the segments 34.4(+12) and 34.12(+12) are the sync blocks numbered 236 to 263 inclusive in a track, where the sync blocks numbered 250 to 263 inclusive are repetitions of the sync blocks numbered 236 to 249 inclusive. The trick play sync blocks numbered 248, 249, 262 and 263 are the parity sync blocks.

The trick play sync blocks in the segments 34.5(+12) and 34.13(+12) are the sync blocks numbered 74 to 101 inclusive in a track, where the sync blocks numbered 88 to 101 inclusive are repetitions of the sync blocks numbered 74 to 87 inclusive. The trick play sync blocks numbered 87 and 101 are the parity sync blocks. Further, the trick play sync blocks in the segments 34.6(+12) and 34.14(+12) are the sync blocks numbered 139 to 166 inclusive in a track, where the sync blocks numbered 153 to 166 inclusive are repetitions of the sync blocks numbered 139 to 152 inclusive. The trick play sync blocks numbered 152 and 166 are the parity sync blocks. The trick play sync blocks in the segments 34.7(+12) and 34.15(+12) are the sync blocks numbered 204 to 231 inclusive in a track, where the sync blocks numbered 218 to 231 inclusive are repetitions of the sync blocks numbered 204 to 217 inclusive. The trick play sync blocks numbered 217 and 231 are the parity sync blocks. Further, the trick play sync blocks in the segments 34.8(+12) and 34.16(+12) are the sync blocks numbered 269 to 296 inclusive in a track, where the sync blocks numbered 283 to 296 inclusive are repetitions of the sync blocks numbered 269 to 282 inclusive. The trick play sync blocks numbered 281, 282, 295 and 296 are the parity sync blocks in the segments.

Thus, during each revolution of the head drum, during a +12 times nominal reproduction mode, 224 sync blocks (8×28) of the third trick play signal are read from the record carrier.

FIG. 4a further shows portions, numbered 34.17(+12) and 34.18(+12), located at the lower edge of some of the tracks in the group of 48 tracks. Those locations are locations that can be read in the +12 times nominal reproduction mode by one of the two read heads, in the present case, the head read having the first azimuth. As the locations shown include the subcode signal recording portion, it is possible to read the information in the subcode signal recording portion, also in the +12 times nominal reproduction mode.

Figure 5:
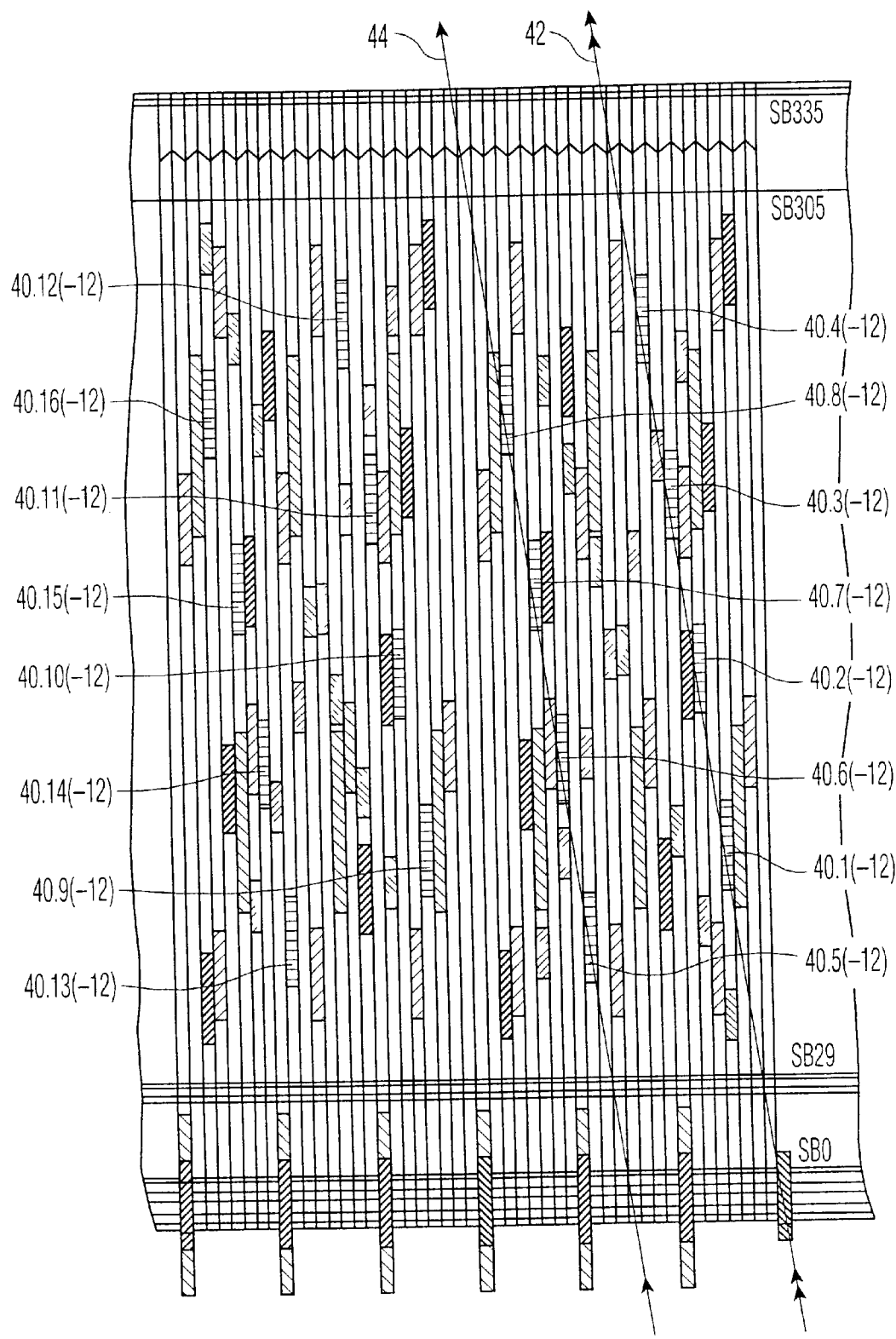
FIG. 5 shows the same format as FIG. 1, with the paths across the record carrier that the two reproduction heads follow during a fourth trick play reproduction mode, where the record carrier speed is −12 times nominal.

FIG. 5 shows a fifth information signal being recorded in specific segments in the tracks. This information signal will be called the fourth trick play signal from now on. The segments are indicated in FIG. 5 by reference numerals 40.i(−12), where i runs from 1 to 16. This fourth trick play signal is meant for a reproduction in a reproduction apparatus at a reproduction speed which is minus 12 times the nominal reproduction speed (that is: in the backwards direction). This fourth trick play signal could be an information signal which has no relationship whatsoever with the signals introduced above. Alternatively, the fourth information signal could have a relationship with the first information signal, in the sense that the fourth trick play signal is a trick play signal for the minus 12 times nominal reproduction speed, in order to obtain a reproduced (video) signal, which is a replica of the reproduced first (video) signal, but reproduced at minus 12 times the nominal speed (in the backwards direction).

Figure 5A:
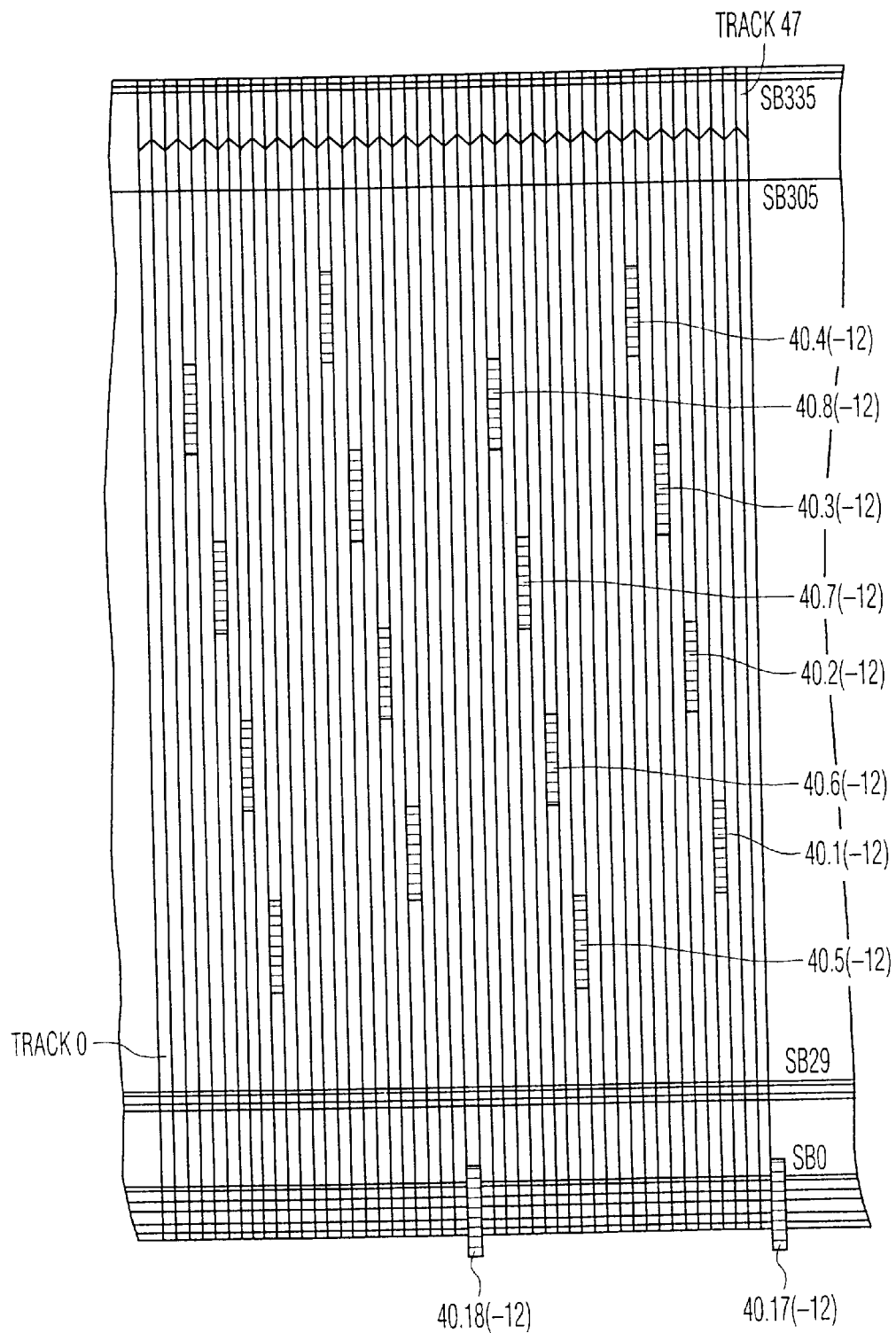
FIG. 5a shows the trick play segments for the −12 times nominal reproduction mode only, in the group of 48 tracks.

FIG. 5a shows the same group of 48 tracks as FIG. 5, however, only the 16 segments 40.i(−12) are shown in FIG. 5a. Assuming the track number of the first track in the group of 48 tracks to be track no. 0, and the track number of the last track in the group to be track number 47, the segments are recorded in the tracks with track number 3+n.2 and 27+n.2, where n is an integer running from 0 to 3 and in tracks with track numbers 14+n.2 and 38+n.2, where n is an integer running from 0 to 3 inclusive.

FIG. 5 further shows two scanning lines 42 and 44. The double arrowed scanning line 42 shows the path that the one read head, having the first azimuth angle, follow across the record carrier in the −12 times nominal reproduction mode, during one revolution of the head drum. The single arrowed scanning line 44 shows the path that the other read head, having the second azimuth angle, follow across the record carrier in the −12 times nominal reproduction mode during the said one revolution of the head drum. As can be seen in FIG. 5, the one read head reads the trick play segments 40.i(−12), where i equals 1 to 4 inclusive (and also 9 to 12 inclusive), and the other read head thus reads the trick play segments 40.j(−12); where j equals 5 to 8 inclusive and 13 to 16 inclusive.

The trick play segments 40.i(−12) each have a length of 28 main sync blocks. As in the +12× trick play situation, in a group of 8 trick play segments read during one revolution of the head drum, six of them comprise two parity sync blocks per segment, and the other two segments comprise 4 sync blocks per segment. Those six segments thus each comprises 13 trick play sync blocks comprising information of the third trick play signal, 13 repetitions of those 13 trick play sync blocks, one parity sync block and one repetition of this parity sync block. Those two remaining segments thus each comprises 12 trick play sync blocks comprising information of the third trick play signal, 12 repetitions of those 12 trick play sync blocks. two parity sync blocks and repetitions of those parity sync blocks.

The trick play segments for the −12 times nominal reproduction speed can be realized as explained in the following example. When, again, numbering the main sync blocks, starting from 0, which is the first sync block in the aux recording area 8 in a track, until 305, which is the last sync block in the area 12a in the track, the sync blocks in the segments 40.1(−12) and 40.9(−12) are the sync blocks numbered 86 to 113 inclusive in a track, where the sync blocks numbered 100 to 113 inclusive are repetitions of the sync blocks numbered 86 to 99 inclusive. The trick play sync block numbers in the segments numbered 99 and 113 are the parity sync blocks. Further, the sync blocks in the segments 40.2(−12) and 40.10(−12) are the sync blocks numbered 141 to 168 inclusive in a track, where the sync blocks numbered 155 to 168 inclusive are repetitions of the sync blocks numbered 141 to 154 inclusive. The sync blocks numbered 154 and 168 are the parity sync blocks in the segments. The sync blocks in the segments 40.3(−12) and 40.11(−12) are the sync blocks in a track numbered 196 to 223 inclusive, where the sync blocks numbered 210 to 223 inclusive are repetitions of the sync blocks numbered 196 to 209 inclusive. The sync blocks numbered 209 and 223 are the parity sync blocks in the segments. Further, the sync blocks in the segments 40.4(−12) and 40.12(−12) are the sync blocks in a track numbered 251 to 278 inclusive, where the sync blocks numbered 265 to 278 inclusive are repetitions of the sync blocks numbered 251 to 264 inclusive. The sync blocks numbered 263, 264, 277 and 278 are the parity sync blocks in the segments.

The sync blocks in the segments 40.5(−12) and 40.13(−12) are the sync blocks in a track numbered 59 to 86 inclusive, where the sync blocks numbered 73 to 86 inclusive are repetitions of the sync blocks numbered 59 to 72 inclusive. The sync blocks numbered 72 and 86 are the parity sync blocks. Further, the sync blocks in the segments 40.6(−12) and 40.14(−12) are the sync blocks in a track numbered 114 to 141 inclusive, where the sync blocks numbered 128 to 141 inclusive are repetitions of the sync blocks numbered 114 to 127 inclusive. The sync blocks numbered 127 and 141 are the parity sync blocks. The sync blocks in the segments 40.7(−12) and 40.15(−12) are the sync blocks in a track numbered 169 to 196 inclusive, where the sync blocks numbered 183 to 196 inclusive are repetitions of the sync blocks numbered 169 to 182 inclusive. The sync blocks numbered 182 and 196 are the parity sync blocks. Further, the sync blocks in the segments 40.8(−12) and 40.16(−12) are the sync blocks in a track numbered 224 to 251 inclusive, where the sync blocks numbered 238 to 251 inclusive are repetitions of the sync blocks numbered 224 to 237 inclusive. The sync blocks numbered 236, 237, 250 and 251 are the parity sync blocks in the segments.

Thus, during each revolution of the head drum, during a −12 times nominal reproduction mode, 224 sync blocks (8×28 sync blocks) of information of the fourth trick play signal are read from the record carrier, which is the same number of sync blocks as for the +12× reproduction mode.

FIG. 5a further shows portions, numbered 40.17(−12) and 40.18(−12), located at the lower edge of some of the tracks in the group of 48 tracks. Those locations are locations that can be read in the −12 times nominal reproduction mode by one of the two read heads, in the present case, the read head having the first azimuth. As the locations shown include the subcode signal recording portion, it is possible to read the information in the subcode signal recording portion, also in the −12 times nominal reproduction mode.

Figure 6:
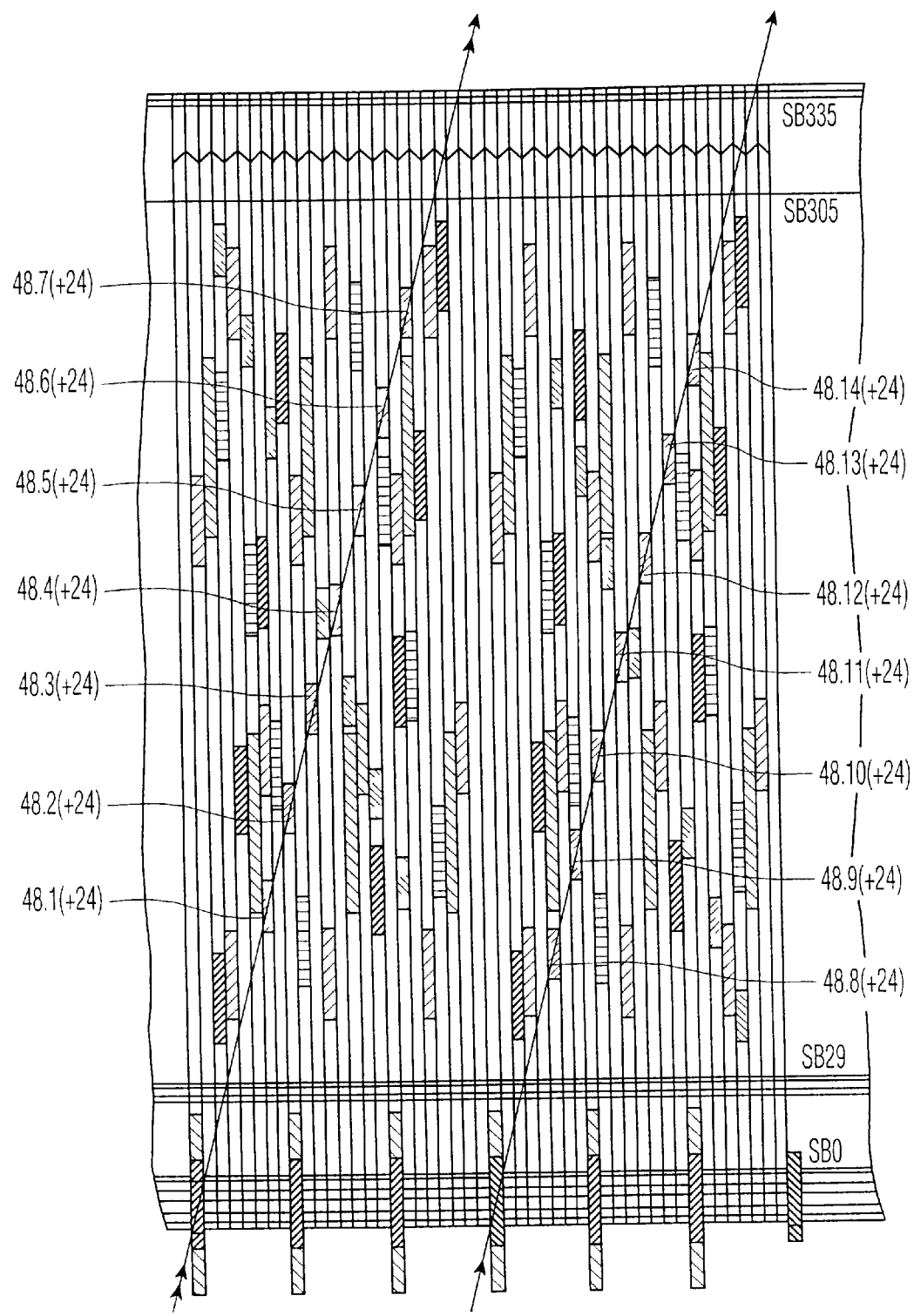
FIG. 6 shows the same format as FIG. 1, with the paths across the record carrier that the two reproduction heads follow during a fifth trick play reproduction mode, where the record carrier speed is +24 times nominal.

FIG. 6 shows a sixth information signal being recorded in specific segments in the tracks. This signal will be defined as the fifth trick play signal hereafter. The segments are indicated in FIG. 6 by reference numerals 48.i(+24), where i runs from 1 to 14. This fifth trick play signal is meant for a reproduction in a reproduction apparatus at a reproduction speed which is +24 times the nominal reproduction speed (that is: in the forward direction). This fifth trick play signal could be an information signal which has no relationship whatsoever with the signals introduced earlier. Alternatively, the fifth trick play signal could have a relationship with the first information signal, in the sense that the fifth trick play signal is a trick play signal for the +24 times nominal reproduction speed, in order to obtain a reproduced (video) signal, which is a replica of the reproduced first (video) signal, but reproduced at +24 times the nominal speed.

Figure 6A:
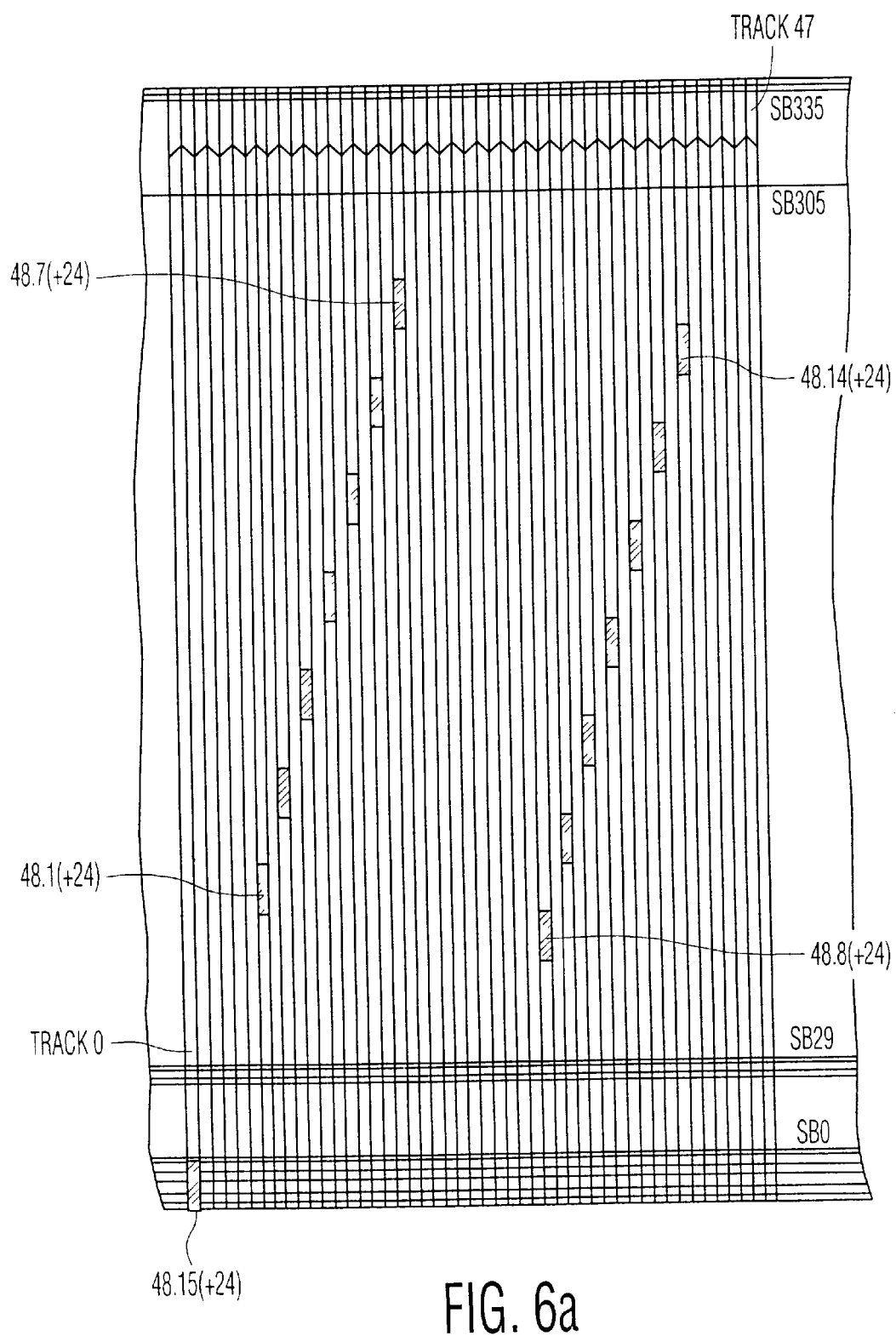
FIG. 6a shows the trick play segments for the +24 times nominal reproduction mode only, in the group of 48 tracks.

FIG. 6a shows the same group of 48 tracks as FIG. 6, however, only the 14 segments 48.i(+24) are shown in FIG. 6a. Assuming the track number of the first track in the group of 48 tracks to be track no. 0, and the track number of the last track in the group to be track number 47, the segments are recorded in the tracks with track number 6+n.2 and 29+n.2, where n is an integer running from 0 to 6 inclusive.

FIG. 6 further shows two scanning lines 50 and 51. The double arrowed scanning line 50 shows the path that the one read, having the first azimuth angle, follows across the record carrier in the +24 times nominal reproduction mode, during one revolution of the head drum. The single arrowed scanning line 51 shows the path that the other read head, having the second azimuth angle, follows across the record carrier in the +24 times nominal reproduction mode during the said one revolution of the head drum. As can be seen in FIG. 6, the one read reads the trick play segments 48.i(+24), where i equals 1 to 7 inclusive, and the other read thus reads the trick play segments 48.j(+24), where j equals 8 to 14 inclusive.

The trick play segments 48.i(+24) each have a length of $(m_3/14=)16$ main sync blocks, where $m_3$ is considered to be equal to 224 in the present example. In the group of 14 trick play segments, four of them each comprises 8 trick play sync blocks of information of the fifth trick play signal and repetitions of those 8 sync blocks. The remaining 10 trick play sync blocks in the group comprise 7 trick play sync blocks of information of the fifth trick play signal, 1 parity sync block and one repetition of both the 7 trick play sync blocks and the parity sync block.

The trick play segments for the +24 times nominal reproduction speed can be realized as explained in the following example. When, again, numbering the main sync blocks, starting from 0, which is the first sync block in the aux recording area 8 in a track, until 305, which is the last sync block in the area 12a in the track, the sync blocks in the segment 48.1(+24) are the sync blocks in a track numbered 76 to 91 inclusive, where the sync blocks numbered 84 to 91 inclusive are repetitions of the sync blocks 76 to 83 inclusive. No parity sync blocks are present in this segment. The sync blocks in the segment 48.2(+24) are the sync blocks in a track numbered 107 to 122 inclusive, where the sync blocks numbered 115 to 122 inclusive are repetitions of the sync blocks numbered 107 to 114 inclusive. The sync blocks numbered 114 and 122 are the parity sync blocks in the segment. The sync blocks in the segment 48.3(+24) are the sync blocks in a track numbered 138 to 153 inclusive, where the sync blocks numbered 146 to 153 inclusive are repetitions of the sync blocks 138 to 145 inclusive. The sync blocks numbered 145 and 153 are the parity sync blocks in the segment. The sync blocks in the segment 48.4(+24) are the sync blocks in a track numbered 169 to 184 inclusive, where the sync blocks numbered 177 to 184 inclusive are repetitions of the sync blocks numbered 169 to 176 inclusive. The sync blocks numbered 176 and 184 are the parity sync blocks in the segment. The sync blocks in the segment 48.5(+24) are the sync blocks in a track numbered 200 to 215 inclusive, where the sync blocks numbered 208 to 215 inclusive are repetitions of the sync blocks 200 to 207 inclusive. The sync blocks numbered 207 and 215 are the parity sync blocks in the segments. The sync blocks in the segment 48.6(+24) are the sync blocks in a track numbered 231 to 246 inclusive, where the sync blocks numbered 239 to 246 inclusive are repetitions of the sync blocks numbered 231 to 238 inclusive. The sync blocks numbered 238 and 246 are the parity sync blocks in the segment. Further, the sync blocks in the segment 48.7(+24) are the sync blocks in a track numbered 262 to 277 inclusive, where the sync blocks numbered 270 to 277 inclusive are repetitions of the sync blocks 262 to 269 inclusive. No parity sync blocks are present in the segment.

The sync blocks in the segment 48.8(+24) are the sync blocks in a track numbered 60 to 75 inclusive, where the sync blocks numbered 68 to 75 inclusive are repetitions of the sync blocks numbered 60 to 67 inclusive. No parity sync blocks are present in the segment. The sync blocks in the segment 48.9(+24) are the sync blocks in a track numbered 91 to 106 inclusive, where the sync blocks numbered 99 to 106 inclusive are repetitions of the sync blocks numbered 91 to 98 inclusive. The sync blocks numbered 98 and 106 are the parity sync blocks in the segment. The sync blocks in the segment 48.10(+24) are the sync blocks in a track numbered 122 to 137 inclusive, where the sync blocks numbered 130 to 137 inclusive are repetitions of the sync blocks numbered 122 to 129 inclusive. The sync blocks numbered 129 and 137 are the parity sync blocks in the segment. The sync blocks in the segment 48.11(+24) are the sync blocks in a track numbered 153 to 168 inclusive, where the sync blocks numbered 161 to 168 inclusive are repetitions of the sync blocks numbered 153 to 160 inclusive. The sync blocks numbered 160 and 168 are the parity sync blocks in the segment. The sync blocks in the segment 48.12(+24) are the sync blocks in a track numbered 184 to 199 inclusive, where the sync blocks numbered 192 to 199 inclusive are repetitions of the sync blocks numbered 184 to 191 inclusive. The sync blocks numbered 191 and 199 are the parity sync blocks in the segment. The sync blocks in the segment 48.13(+24) are the sync blocks in a track numbered 215 to 230 inclusive, where the sync blocks numbered 223 to 230 inclusive are repetitions of the sync blocks numbered 215 to 222 inclusive. The sync blocks numbered 222 and 230 are the parity sync blocks in the segment. The sync blocks in the segment 48.14(+24) are the sync blocks in a track numbered 246 to 261 inclusive, where the sync blocks numbered 254 to 261 are repetitions of the sync blocks numbered 246 to 253 inclusive. No parity sync blocks are present in the segment.

Thus, during each revolution of the head drum, during a +24 times nominal reduction mode, 224 sync blocks (14×16 sync blocks) of information of the fifth trick play signal are read from the record carriers.

FIG. 6a further shows a portion, numbered 48.15(+24), located at the lower edge of one of the tracks in the group of 48 tracks. This location is a location that can be read in the +24 times nominal reproduction mode by one of the two read heads, in the present case, the read having the first azimuth. As the location shown includes the subcode signal recording portion, it is possible to read the information in the subcode signal recording portion, also in the +24 times nominal reproduction mode.

Figure 7:
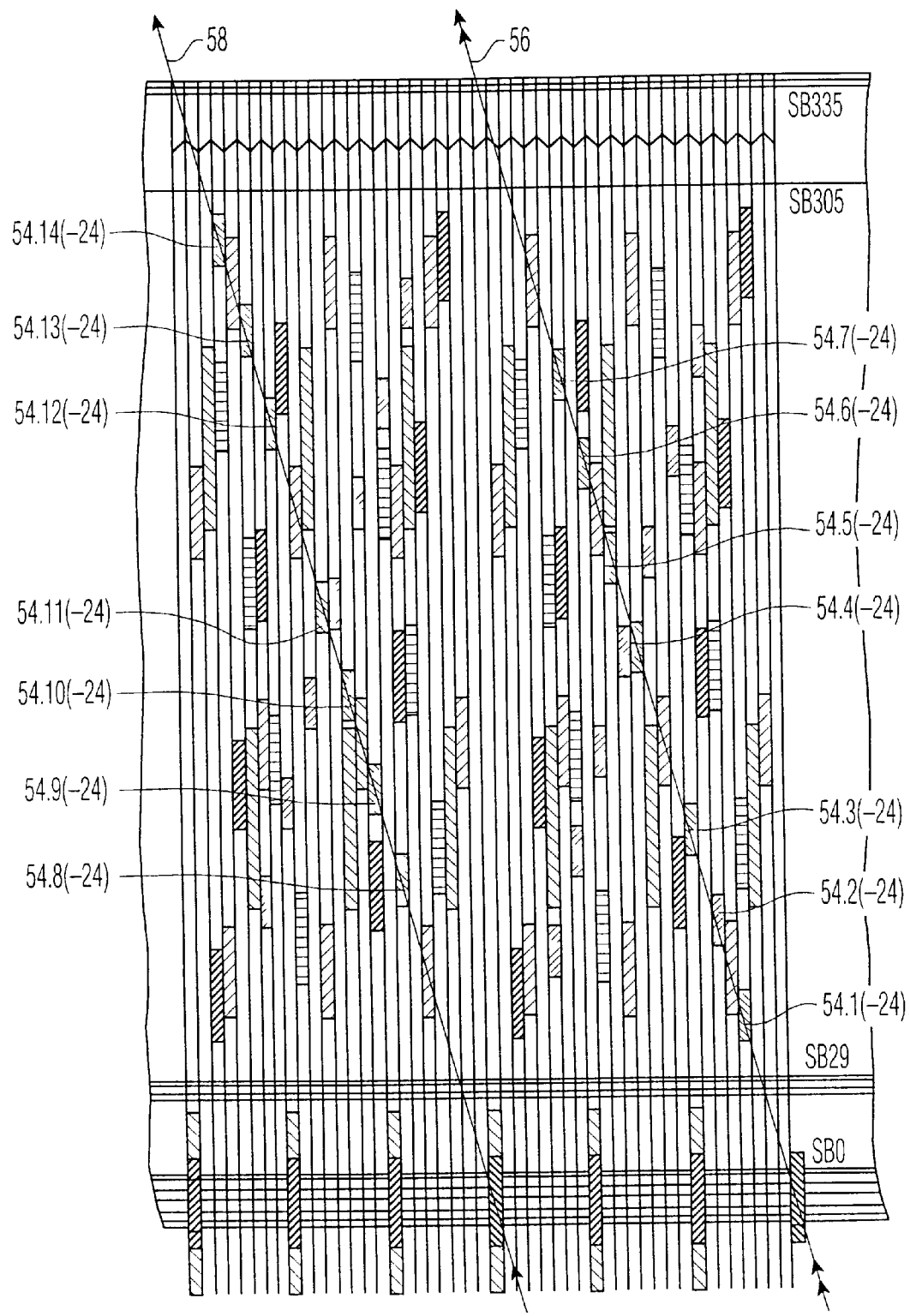
FIG. 7 shows the same format as FIG. 1, with the paths across the record carrier that the two reproduction heads follow during a sixth trick play reproduction mode, where the record carrier speed is −24 times nominal.

FIG. 7 shows a seventh information signal being recorded in specific segments in the tracks. This information signal will be called the sixth trick play signal from now on. The segments are indicated in FIG. 7 by reference numerals 54.i(−24), where i runs from 1 to 14. This sixth trick play signal is meant for a reproduction in a reproduction apparatus at a reproduction speed which is −24 times the nominal reproduction speed (that is: in the backwards direction). This sixth trick play signal could be an information signal which has no relationship whatsoever with the signals introduced earlier. Alternatively, the sixth trick play signal could have a relationship with the first information signal, in the sense that the sixth trick play signal is a trick play signal for the −24 times nominal reproduction speed, in order to obtain a reproduced (video) signal, which is a replica of the reproduced first (video) signal, but reproduced at −24 times the nominal speed (that is: in the backwards direction).

Figure 7A:
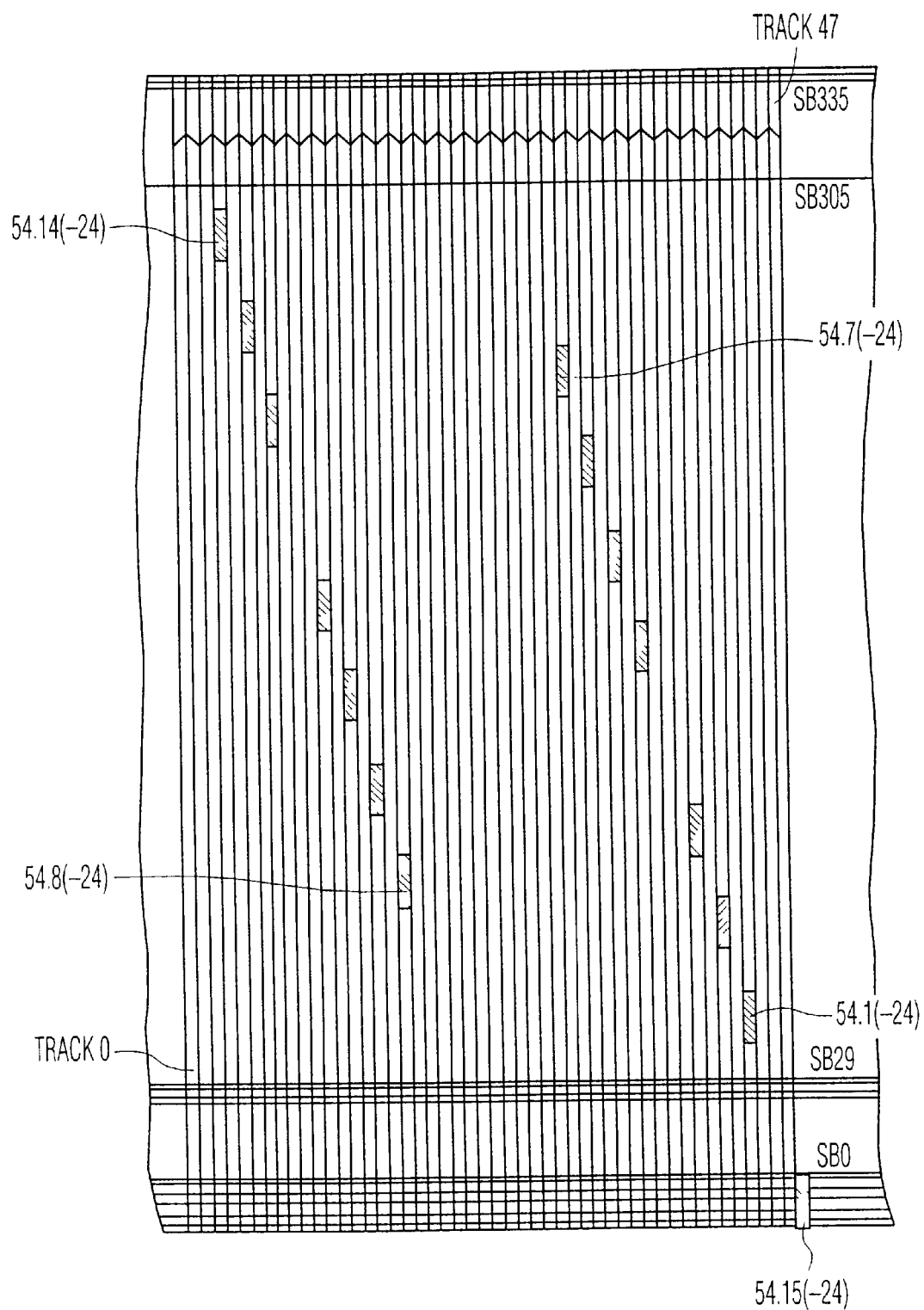
FIG. 7a shows the trick play segments for the −24 times nominal reproduction mode only, in the group of 48 tracks.

FIG. 7a shows the same group of 48 tracks as FIG. 7, however, only the 14 segments 54.i(−24) are shown in FIG. 7a. Assuming the track number of the first track in the group of 48 tracks to be track no. 0, and the track number of the last track in the group to be track number 47, the segments are recorded in the tracks with track number 3, 5, 7, 11, 13, 15, 17, 30, 32, 34, 36, 40, 42 and 44.

FIG. 7 further shows two scanning lines 56 and 58. The double arrowed scanning line 56 shows the path that the one,head, having the first azimuth angle, follow across the record carrier in the −24 times nominal reproduction mode, during one revolution of the head drum. The single arrowed scanning line 58 shows the path that the other read head, having the second azimuth angle, follow across the record carrier in the −24 times nominal reproduction mode during the said one revolution of the head drum. As can be seen in FIG. 7, the one read head reads the trick play segments 54.i(−24), where i equals 1 to 7 inclusive, and the other read head thus reads the trick play segments 54.j(−24), where j equals 8 to 14 inclusive.

The trick play segments 54.i(−24) each have a length of $(m_3/14=)16$ main sync blocks, where $m_3$ is again considered to be equal to 224 in the present example. In the group of 14 trick play segments, four of them each comprises 8 trick play sync blocks of information of the fifth trick play signal and repetitions of those 8 sync blocks. The remaining 10 trick play sync blocks in the group comprise 7 trick play sync blocks of information of the fifth trick play signal, 1 parity sync block and one repetition of both the 7 trick play sync blocks and the parity sync block.

The trick play segments for the −24 times nominal reproduction speed can be realized as explained in the following example. When, again, numbering the main sync blocks, starting from 0, which is the first sync block in the aux recording area 8 in a track, until 305, which is the last sync block in the area 12a in the track, the sync blocks in the segment 54.1(−24) are the sync blocks in a track numbered 40 to 55 inclusive, where the sync blocks numbered 48 to 55 inclusive are repetitions of the sync blocks 40 to 47 inclusive. No parity sync blocks are present in the segment. The sync blocks in the segment 54.2(−24) are the sync blocks in a track numbered 68 to 83 inclusive, where the sync blocks numbered 76 to 83 are repetitions of the sync blocks numbered 68 to 75 inclusive. The sync blocks numbered 75 and 83 are the parity sync blocks. The sync blocks in the segment 54.3(−24) are the sync blocks in a track numbered 97 to 112 inclusive, where the sync blocks numbered 105 to 112 inclusive are repetitions of the sync blocks 97 to 104. The sync blocks numbered 104 and 112 are the parity sync blocks in the segment. The sync blocks in the segment 54.4(−24) are the sync blocks in a track numbered 154 to 169 inclusive, where the sync blocks numbered 162 to 169 inclusive are repetitions of the sync blocks numbered 154 to 161 inclusive. The sync blocks numbered 161 and 169 are the parity sync blocks in the segment. The sync blocks in the segment 54.5(−24) are the sync blocks in a track numbered 182 to 197 inclusive, where the sync blocks numbered 190 to 197 inclusive are repetitions of the sync blocks 182 to 189 inclusive. The sync blocks numbered 189 and 197 are the parity sync blocks in the segment. The sync blocks in the segment 54.6(−24) are the sync blocks in a track numbered 211 to 226 inclusive, where the sync blocks numbered 219 to 226 inclusive are repetitions of the sync blocks numbered 211 to 218 inclusive. The sync blocks numbered 218 and 226 are the parity sync blocks in the segment. Further, the sync blocks in the segment 54.7(−24) are the sync blocks in a track numbered 239 to 254 inclusive, where the sync blocks numbered 247 to 254 inclusive are repetitions of the sync blocks 239 to 246 inclusive. No parity sync blocks are present in the segment. The sync blocks in the segment 54.8(−24) are the sync blocks in a track numbered 83 to 98 inclusive, where the sync blocks umbered 91 to 98 inclusive are repetitions of the sync blocks numbered 83 to 90 inclusive. No parity sync blocks are present in the segment.

The sync blocks in the segment 54.9(−24) are the sync blocks in a track numbered 111 to 126 inclusive, where the sync blocks numbered 119 to 126 inclusive are repetitions of the sync blocks numbered 111 to 118 inclusive. The sync blocks numbered 118 and 126 are the parity sync blocks in the segment. The sync blocks in the segment 54.10(−24) are the sync blocks in a track numbered 140 to 155 inclusive, where the sync blocks numbered 148 to 155 are repetitions of the sync blocks numbered 140 to 147 inclusive. The sync blocks numbered 147 and 155 are the parity sync blocks in the segment. The sync blocks in the segment 54.11(−24) are the sync blocks in a track numbered 168 to 183 inclusive, where the sync blocks numbered 176 to 183 inclusive are repetitions of the sync blocks numbered 168 to 175 inclusive. The sync blocks numbered 175 and 183 are the parity sync blocks in the segment. The sync blocks in the segment 54.12(−24) are the sync blocks in a track numbered 275 to 240 inclusive, where the sync blocks numbered 233 to 240 inclusive are repetitions of the sync blocks numbered 225 to 232 inclusive. The sync blocks numbered 232 and 240 are the parity sync blocks in the segment. The sync blocks in the segment 54.13(−24) are the sync blocks in a track numbered 254 to 269 inclusive, where the sync blocks numbered 262 to 269 inclusive are repetitions of the sync blocks numbered 254 to 261 inclusive. The sync blocks numbered 261 and 269 are the parity sync blocks in the segment. The sync blocks in the segment 54.14(−24) are the sync blocks in a track numbered 282 to 297 inclusive, where the sync blocks numbered 290 to 297 inclusive are repetitions of the sync blocks numbered 282 to 289 inclusive. No parity sync blocks are present in the segment.

Thus, during each revolution of the head drum, during a −24 times nominal reproduction mode, 224 sync blocks (14×16 sync blocks) of information of the sixth trick play signal are read from the record carrier, which is the same number of sync blocks as in the +24× reproduction mode.

FIG. 7a further shows a portion, numbered 54.15(−24), located at the lower edge of one of the tracks in the group of 48 tracks. This location is a location that can be read in the −24 times nominal reproduction mode by one of the two read heads, in the present case, the read head having the first azimuth. As the location shown includes the subcode signal recording portion, it is possible to read the information in the subcode signal recording portion, also in the −24 times nominal reproduction mode.

The trick play sync blocks for each of the various trick play modes described above have their own trick play sync block numbering. The trick play sync block numbering that will be discussed now, is thus different from the sync block numbers used above to identify the exact locations of the various segments in a track As a general rule, it can be said that:
(a) for the trick play speeds +4× nominal and −4× nominal, in total, 112 trick play sync blocks are read during each revolution of the head drum, that is, 102 sync blocks comprising information of the trick play signals in question and 10 sync blocks comprising parity information. Those 102 trick play sync blocks are numbered with trick play sync block numbers 0 to 101 inclusive, in the order in which they are read during one revolution of the head drum in the trick play reproduction mode, where the trick play sync block having the trick play sync block number 0 is the first trick play sync block read by the read head having the first azimuth. The 10 parity sync blocks are numbered 102 to 111, in the order in which they are read during one revolution of the head drum, where the trick play sync block having the trick play sync block number 102 is the first trick play sync block comprising parity information that is read by the read head having the first azimuth.
(b) for the trick play speeds +12× and −12× nominal, in total, 224 trick play sync blocks are read during each revolution of the head drum, that is, 2 times 112 trick play sync blocks, each one of 102 of the 224 trick play sync blocks comprising information of the trick play signals in question. Further, one repetition of each of those 102 trick play sync blocks is read during the said one revolution, and further 10 parity sync blocks and one repetition of each of those 10 parity sync blocks. Those 102 trick play sync blocks are again numbered 0 to 101 inclusive, in the order in which they are read during said one revolution of the head drum in the trick play reproduction mode, where the sync block having the trick play sync block number 0 is the first trick play sync block that is read by the read head having the first azimuth. The 10 parity sync blocks are numbered 102 to 111, in the order in which they are read during one revolution of the head drum, where the trick play sync block having the trick play sync block number 102 is the first trick play sync block comprising parity information that is read by the read head having the first azimuth. A repetition of a sync block has the same trick play sync block number as the sync block from which it is a repetition.
(c) for the trick play speeds +24× and −24× nominal, in total again, 224 trick play sync blocks are read during each revolution of the head drum, that is, 2 times 102 trick play sync blocks comprising information of the trick play signals in question and 2 times 10 parity sync blocks. Those 102 trick play sync blocks are again numbered 0 to 101 inclusive, in the order in which they are read during the said one revolution of the head drum in the trick play reproduction mode, where the sync block having the number 0 is the first trick play sync block that is read by the read head having the first azimuth. The 10 parity sync blocks are numbered 102 to 111, in the order in which they are read during one revolution of the head drum, where the trick play sync block having the trick play sync block number 102 is the first trick play sync block comprising parity information that is read by the read head having the first azimuth. A repetition of a sync block has the same trick play sync block number as the sync block from which it is a repetition.

First, the trick play sync block numbering for the first trick play signal (+4×reproduction speed) will be discussed. In the time interval of one rotation of the head drum, during reproduction at the +4 times reproduction speed the first read head having the first azimuth angle scans the trick play segment 22.1(+4), and the other read head scans the trick play segment 22.2(+4). The first 51 sync blocks in the segment 22.1(+4) have trick play sync block numbers running from 0 to 50 inclusive. The first 51 sync blocks in the segment 22.2(+4) have trick play sync block numbers running from 51 to 101 inclusive.

The five sync blocks in the segment 22.1(+4) comprising the parity information, following the 51 sync blocks numbered 0 to 50 inclusive, have trick play sync block numbers 102 to 106 inclusive and the five sync blocks in the segment 22.2(+4) comprising the parity information, following the 51 sync blocks numbered 51 to 101 inclusive, have trick play sync block numbers 107 to 111 inclusive.

The trick play sync block numbering described above is valid for all the pairs of segments 22.i(+4) and 22.i+1(+4), where i is odd. The trick play sync block numbering is thus repetitive for each rotation of the head drum in the −4 times reproduction mode.

It is thus interesting to note that the trick play sync block numbering in a segment is discontinuous across the boundary between the sync blocks comprising the parity information and the other sync blocks in the segment.

Next, the trick play sync block numbering for the second trick play signal (−4× reproduction speed) will be discussed. In the time interval of one rotation of the head drum, during reproduction at the −4 times reproduction speed, the first read head having the first azimuth angle scans the trick play segments 28.1(−4) and 28.2(−4) and the other read head scans the trick play segments 28.3(−4) and 28.4(−4). The first 26 sync blocks in the segment 28.1(−4) have trick play sync block numbers running from 0 to 25 inclusive. The first 25 sync blocks in the segment 28.2(−4) have trick play sync block numbers running from 26 to 50 inclusive.

The first 26 sync blocks in the segment 28.3(−4) have trick play sync block numbers running from 51 to 76 inclusive. The first 25 sync blocks in the segment 28.4(−4) have trick play sync block numbers running from 77 to 101 inclusive.

The two sync blocks in the segment 28.1(−4) comprising the parity information, following the 26 sync blocks numbered 0 to 25 inclusive, have the trick play sync block numbers 102 and 103. The three sync blocks in the segment 28.2(−4) comprising the parity information, following the 25 sync blocks numbered 26 to 50 inclusive, have trick play sync block numbers 104, 105 and 106. The two sync blocks in the segment 28.3(−4) comprising the parity information, following the 26 sync blocks numbered 51 to 76 inclusive, have trick play sync block numbers 107 and 108. The three sync blocks in the segment 28.4(−4) comprising the parity information, following the 25 sync blocks numbered 77 to 101 inclusive, have trick play sync block numbers 109,110 and 111.

The trick play sync block numbering described above is valid for all groups of four segments 28.i(4), 28.i−1(−4), 28.i−2(4) and 28.i−3(4), where i equals 1, 5, 9, 13, 17 and 21. The trick play sync block numbering is thus repetitive for each rotation of the head drum in the −4 times reproduction mode.

It is further again interesting to note that the trick play sync block numbering in a segment is discontinuous across the boundary between the sync blocks comprising the parity information and the other sync blocks in the segment.

The reason for choosing the order of occurrence of the trick play sync blocks and trick play sync block numbering for the +4× and 4×trick play reproduction mode in the way as explained above is as follows. This choice has the advantage that carrying out an ECC encoding on the trick play data can become an optional recording feature, or, if the ECC encoding is indeed carried out on the trick play data upon recording, ECC correction may become an optional reproduction feature. The format enables a different ECC encoding, so that e.g. more or lesser trick play sync blocks may be required for storing the parity data. As the parity sync blocks are located at the end of each of the segments, and the numbering of parity sync blocks (102 and higher) follows the numbering of the 102 trick play sync blocks (0 to 101 inclusive) comprising the 'real' information data, the numbering of those trick play sync blocks comprising 'real' data remains unchanged and can thus be processed in the reproducing apparatus independent of whether trick play sync blocks comprising parity data are present or not, or independent of the number of how many trick play sync blocks comprising parity data are present.

Next, the trick play sync block numbering for the third trick play signal (+12×reproduction speed) will be discussed. In the time interval of one rotation of the head drum, during reproduction at the +12 times reproduction speed, the first read head having the first azimuth angle scans the trick play segments 34.i(+12), where i runs from 1 to 4, and the other read head scans the trick play segments 34.j(+12), where j runs from 5 to 8. The first 13 sync blocks in the segment 34.1(+12) have trick play sync block numbers running from 0 to 12 inclusive. The first 13 sync blocks in the segment 34.2(+12) have trick play sync block numbers running from 13 to 25 inclusive. The first 13 sync blocks in the segment 34.3(+12) have trick play sync block numbers running from 26 to 38 inclusive. The first 12 sync blocks in the segment 34.4(+12) have trick play sync block numbers running from 39 to 50 inclusive.

The first 13 sync blocks in the segment 34.5(+12) have trick play sync block numbers running from 51 to 63 inclusive. The first 13 sync blocks in the segment 34.6(+12) have trick play sync block numbers running from 64 to 76 inclusive. The first 13 sync blocks in the segment 34.7(+12) have trick play sync block numbers running from 77 to 89 inclusive. The first 12 sync blocks in the segment 34.8(+12) have trick play sync block numbers running from 90 to 101 inclusive.

The second 13 or 12 sync blocks, being repetitions of the first 13 or 12 sync blocks respectively, in a segment, have the same trick play sync block numbers as the sync blocks from which they are repetitions.

The parity sync block in between the trick play sync blocks numbered 12 and 0 in the segment 34.1(+12) has the trick play sync block number 102. Its repetition at the end of that segment has the same trick play sync block number. The parity sync block in between the trick play sync blocks numbered 25 and 13 in the segment 34.2(+12) has the trick play sync block number 103. Its repetition at the end of that segment has the same trick play sync block number. The parity sync block in between the trick play sync blocks numbered 38 and 26 in the segment 34.3(+12) has the trick play sync block number 104. Its repetition at the end of that segment has the same trick play sync block number. The parity sync blocks in between the trick play sync blocks numbered 50 and 39 in the segment 34.4(+12) have the trick play sync block numbers 105 and 106. Their repetitions at the end of that segment have the same trick play sync block numbers.

The parity sync block in between the trick play sync blocks numbered 63 and 51 in the segment 34.5(+12) has the trick play sync block number 107. Its repetition at the end of that segment has the same trick play sync block number. The parity sync block in between the trick play sync blocks numbered 76 and 64 in the segment 34.6(+12) has the trick play sync block number 108. Its repetition at the end of that segment has the same trick play sync block number. The parity sync block in between the trick play sync blocks numbered 89 and 77 in the segment 34.7(+12) has the trick play sync block number 109. Its repetition at the end of that segment has the same trick play sync block number. The parity sync blocks in between the trick play sync blocks numbered 101 and 90 in the segment 34.8(+12) have the trick play sync block numbers 110 and 111. Their repetitions at the end of that segment have the same trick play sync block numbers.

The trick play sync block numbering described above is valid for all groups of eight segments 34.i(+12) to 34.i+7(+12), where i equals 1 or 9. The trick play sync block numbering is thus repetitive for each rotation of the head drum in the +12 times reproduction mode.

Next, the trick play sync block numbering for the fourth trick play signal (−12×reproduction speed) will be discussed. In the time interval of one rotation of the head drum, during reproduction at the −12 times reproduction speed, the first read head having the first azimuth angle scans the trick play segments 40.i(−12), where i runs from 1 to 4, and the other read head scans the trick play segments 40.j(−12), where j runs from 5 to 8. The first 13 sync blocks in the segment 40.1(−12) have trick play sync block numbers running from 0 to 12 inclusive. The first 13 sync blocks in the segment 40.2(−12) have trick play sync block numbers running from 13 to 25 inclusive. The first 13 sync blocks in the segment 40.3(−12) have trick play sync block numbers running from 26 to 38 inclusive. The first 12 sync blocks in the segment 40.4(−12) have trick play sync block numbers running from 39 to 50 inclusive.

The first 13 sync blocks in the segment 40.5(−12) have trick play sync block numbers running from 51 to 63 inclusive. The first 13 sync blocks in the segment 40.6(−12) have trick play sync block numbers running from 64 to 76 inclusive. The first 13 sync blocks in the segment 40.7(−12) have trick play sync block numbers running from 77 to 89 inclusive. The first 12 sync blocks in the segment 40.8(−12) have trick play sync block numbers running from 90 to 101 inclusive.

The second 13 or 12 sync blocks, being repetitions of the first 13 or 12 sync blocks respectively, in a segment, have the same trick play sync block numbers as the sync blocks from which they are repetitions.

The parity sync block in between the trick play sync blocks numbered 12 and 0 in the segment 40.1(−12) has the trick play sync block number 102. Its repetition at the end of that segment has the same trick play sync block number. The parity sync block in between the trick play sync blocks numbered 25 and 13 in the segment 40.2(−12) has the trick play sync block number 103. Its repetition at the end of that segment has the same trick play sync block number. The parity sync block in between the trick play sync blocks numbered 38 and 26 in the segment 40.3(−12) has the trick play sync block number 104. Its repetition at the end of that segment has the same trick play sync block number. The parity sync blocks in between the trick play sync blocks numbered 50 and 39 in the segment 40.4(−12) have the trick play sync block numbers 105 and 106. Their repetitions at the end of that segment have the same trick play sync block numbers.

The parity sync block in between the trick play sync blocks numbered 63 and 51 in the segment 40.5(−12) has the trick play sync block number 107. Its repetition at the end of that segment has the same trick play sync block number. The parity sync block in between the trick play sync blocks numbered 76 and 64 in the segment 40.6(−12) has the trick play sync block number 108. Its repetition at the end of that segment has the same trick play sync block number. The parity sync block in between the trick play sync blocks numbered 89 and 77 in the segment 40.7(−12) has the trick play sync block number 109. Its repetition at the end of that segment has the same trick play sync block number. The parity sync blocks in between the trick play sync blocks numbered 101 and 90 in the segment 40.8(−12) have the trick play sync block numbers 110 and 111. Their repetitions at the end of that segment have the same trick play sync block numbers.

The trick play sync block numbering described above is valid for all groups of eight segments 40.i(−12) to 40.i+7(−12), where i equals 1 or 9. The trick play sync block numbering is thus repetitive for each rotation of the head drum in the +12 times reproduction mode.

Next, the trick play sync block numbering for the fifth trick play signal (+24× reproduction speed) will be discussed. In the time interval of one rotation of the head drum, during reproduction at the +24 times reproduction speed, the first read head having the first azimuth angle scans the trick play segments 48.i(+24), where i runs from 1 to 7, and the other read head scans the trick play segments 48.j(+24), where j runs from 8 to 14. The first eight sync blocks in the segment 48.1(+24) have trick play sync block numbers running from 0 to 7 inclusive. The first seven sync blocks in the segment 48.2(+24) have trick play sync block numbers running from 8 to 14 inclusive. The first seven sync blocks in the segment 48.3(+24) have trick play sync block numbers running from 15 to 21 inclusive. The first seven sync blocks in the segment 48.4(+24) have trick play sync block numbers running from 22 to 28 inclusive. The first seven sync blocks in the segment 48.5(+24) have trick play sync block numbers running from 29 to 35 inclusive. The first seven sync blocks in the segment 48.6(+24) have trick play sync block numbers running from 36 to 42 inclusive. The first eight sync blocks in the segment 48.7(+24) have trick play sync block numbers running from 43 to 50 inclusive. The first eight sync blocks in the segment 48.8(+24) have trick play sync block numbers running from 51 to 58 inclusive. The first seven sync blocks in the segment 48.9(+24) have trick play sync block numbers running from 59 to 65 inclusive. The first seven sync blocks in the segment 48.10(+24) have trick play sync block numbers running from 66 to 72 inclusive. The first seven sync blocks in the segment 48.11(+24) have trick play sync block numbers running from 73 to 79 inclusive. The first seven sync blocks in the segment 48.12(+24) have trick play sync block numbers running from 80 to 86 inclusive. The first seven sync blocks in the segment 48.13(+24) have trick play sync block numbers running from 87 to 93 inclusive. The first eight sync blocks in the segment 48.14(+24) have trick play sync block numbers running from 94 to 101 inclusive.

The second group of eight sync blocks in the segments 48.1, 48.7, 48.8 and 48.14 are repetitions of the first group of the sync blocks in the respective segments. Those sync blocks have the same trick play sync block numbers as the sync blocks in the first group from which they are repetitions.

The two parity sync blocks in the segment 48.2 both have the trick play sync block number 102. The two parity sync blocks in the segment 48.3 both have the trick play sync block number 103. The two parity sync blocks in the segment 48.4 both have the trick play sync block number 104. The two parity sync blocks in the segment 48.5 both have the trick play sync block number 105. The two parity sync blocks in the segment 48.6 both have the trick play sync block number 106. The two parity sync blocks in the segment 48.9 both have the trick play sync block number 107. The two parity sync blocks in the segment 48.10 both have the trick play sync block number 108. The two parity sync blocks in the segment 48.11 both have the trick play sync block number 109. The two parity sync blocks in the segment 48.12 both have the trick play sync block number 110. The two parity sync blocks in the segment 48.13 both have the trick play sync block number 111.

The group of seven sync blocks in between the two parity sync blocks in the segments 48.2 to 48.6 and 48.9 to 48.13 are repetitions of the first group of seven sync blocks in the respective segments. Those sync blocks have the same trick play sync block numbers as the sync blocks in the first group from which they are repetitions.

The trick play sync block numbering described above is valid for all groups of 14 segments 48.i(+24) in a group of 48 track where i runs from 1 to 14. The trick play sync block numbering from 0 to 111 is thus repetitive for each rotation of the head drum in the +24 times reproduction mode.

Next, the trick play sync block numbering for the sixth trick play signal (−24×reproduction speed) will be discussed. In the time interval of one rotation of the head drum, during reproduction at the −24 times reproduction speed, the first read head having the first azimuth angle scans the trick play segments 54.i(−24), where i runs from 1 to 7, and the other read head scans the trick play segments 54.j(−24); where j runs from 8 to 14.

The first eight sync blocks in the segment 54.1(−24) have trick play sync block numbers running from 0 to 7 inclusive. The first seven sync blocks in the segment 54.2(−24) have trick play sync block numbers running from 8 to 14 inclusive. The first seven sync blocks in the segment 54.3(−24)

have trick play sync block numbers running from 15 to 21 inclusive. The first seven sync blocks in the segment 54.4 (−24) have trick play sync block numbers running from 22 to 28 inclusive. The first seven sync blocks in the segment 54.5(−24) have trick play sync block numbers running from 29 to 35 inclusive. The first seven sync blocks in the segment 54.6(−24) have trick play sync block numbers running from 36 to 42 inclusive. The first eight sync blocks in the segment 54.7(−24) have trick play sync block numbers running from 43 to 50 inclusive. The first eight sync blocks in the segment 54.8(−24) have trick play sync block numbers running from 51 to 58 inclusive. The first seven sync blocks in the segment 54.9(−24) have trick play sync block numbers running from 59 to 65 inclusive. The first seven sync blocks in the segment 54.10(−24) have trick play sync block numbers running from 66 to 72 inclusive. The first seven sync blocks in the segment 54.11(−24) have trick play sync block numbers running from 73 to 79 inclusive. The first seven sync blocks in the segment 54.12(−24) have trick play sync block numbers running from 80 to 86 inclusive. The first seven sync blocks in the segment 54.13(−24) have trick play sync block numbers running from 87 to 93 inclusive. The first eight sync blocks in the segment 54.14(−24) have trick play sync block numbers running from 94 to 101 inclusive.

The second group of eight sync blocks in the segments 54.1, 54.7, 54.8 and 54.14 are repetitions of the first group of the sync blocks in the respective segments. Those sync blocks have the same trick play sync block numbers as the sync blocks in the first group from which they are repetitions.

The two parity sync blocks in the segment 54.2 both have the trick play sync block number 102. The two parity sync blocks in the segment 54.3 both have the trick play sync block number 103. The two parity sync blocks in the segment 54.4 both have the trick play sync block number 104. The two parity sync blocks in the segment 54.5 both have the trick play sync block number 105. The two parity sync blocks in the segment 54.6 both have the trick play sync block number 106. The two parity sync blocks in the segment 54.9 both have the trick play sync block number 107. The two parity sync blocks in the segment 54.10 both have the trick play sync block number 108. The two parity sync blocks in the segment 54.11 both have the trick play sync block number 109. The two parity sync blocks in the segment 54.12 both have the trick play sync block number 110. The two parity sync blocks in the segment 54.13 both have the trick play sync block number 111.

The group of seven sync blocks in between the two parity sync blocks in the segments 54.2 to 54.6 and 54.9 to 54.13 are repetitions of the first group of seven sync blocks in the respective segments. Those sync blocks have the same trick play sync block numbers as the sync blocks in the first group from which they are repetitions.

The trick play sync block numbering described above is valid for all groups of 14 segments 54.i(−24) in a group of 48 tracks, where i runs from 1 to 14. The trick play sync block numbering from 0 to 111 is thus repetitive for each rotation of the head drum in the −24 times reproduction mode.

The trick play sync block numbers 0 to 111 inclusive require a 7-bit count word, denoted TPSB#. During a scan of the record carrier by one of the read heads in a trick play reproduction mode, at maximum 56 trick play sync blocks are read. So, when taken into account the read head that is in reproducing contact with the record carrier, one could use a 6-bit count word RSB# as the sync block number of the trick play sync blocks, and thereby saving one bit during storage of the trick play sync blocks on the record carrier.

The 7-bit trick play sync block numbers TPSB# can be converted in the following way into the 6-bit numbers RSB#:

RSB# equals the 6 least significant bits of TPSB#, when the trick play sync block number is smaller than 52 and the corresponding trick play sync block is written by the first write head, having the first azimuth angle. 1.1

Otherwise, RSB# equals the 6 least significant bits of (TPSB#−48). 1.2

Reconversion into the trick play sync block number upon reproduction in a trick play mode is realized in the following way:

The 6 least significant bits of TPSB# equal RSB#, when the RSB# is smaller than 52 and the corresponding trick play sync block is read by the first read head, having the first read head, having the first azimuth angle. The 7th bit of TPSB# is then taken '0'. 2.1

Otherwise, TPSB#=RSB#+48. 2.2

Next follows a table showing the trick play sync block numbers TPSB# for all the trick play reproduction modes, where the read head having the first azimuth reads the trick play sync blocks numbered 0 to 50 inclusive, and 102 to 106 inclusive, during one scan, and the read head having the second azimuth reads the trick play sync blocks numbered 51 to 101 inclusive and 107 to 111 inclusive.

| TPSB#       | TP data SB's | TP parity SB's |
|-------------|--------------|----------------|
| 1st azimuth | 0 . . . 50   | 102 . . . 106  |
| 2nd azimuth | 51 . . . 101 | 107 . . . 111  |

Upon conversion, as explained above, the RSB# are as follows:

| RSB#        | TP data SB's | TP parity SB's |
|-------------|--------------|----------------|
| 1st azimuth | 0 . . . 49   | 54 . . . 58    |
| 2nd azimuth | 3 . . . 53   | 59 . . . 63    |

As can be seen from the second table, the value to be subtracted from TPSB# cannot be smaller than 48, as, otherwise the RSB# for the trick play parity sync blocks read by the second azimuth read head would exceed 63, which is not allowed, as 63 is the highest number than can be represented by the 6-bit RSB word.

The value could be chosen larger than the value '48', as given in the formula under point 1.2 above. The maximum value could be 51, as this would lead to RSB#for the trick play data sync blocks read by the second head having the numbers 0 . . . 50.

Next, the format of the trick play sync blocks will be discussed with reference to FIG. 8. A trick play sync block has the same length as the other sync blocks in the main data area 12 of FIG. 1, in which the first digital information signal is stored. A trick play sync block is 112 bytes long and comprise a sync word of 2 bytes long, an identification portion 60, denoted ID, a header portion 61, denoted 'main header', an aux byte 62, denoted 'data-aux' and a data area 64, which is 104 bytes long. The data area 64 has room for storage of 96 bytes of data of a trick play signal (one of the second to seventh information signals) and 8 parity bytes.

Figure 8:
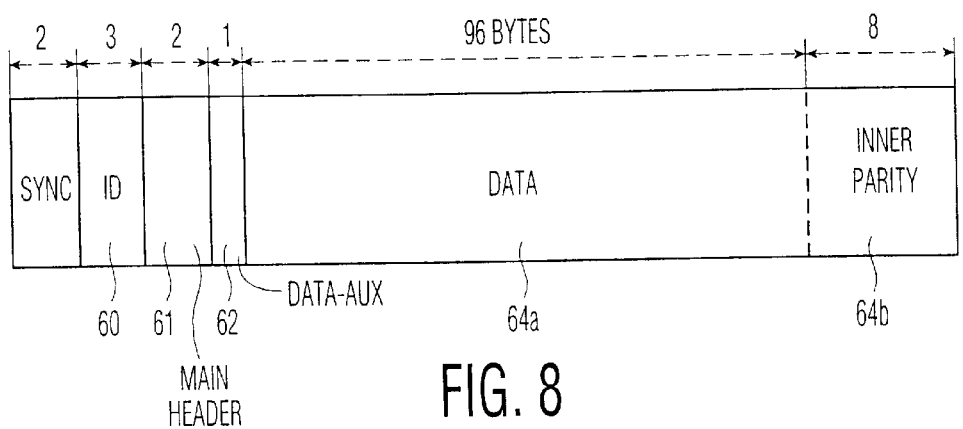
FIG. 8 shows the format of a sync block.
Figure 9:
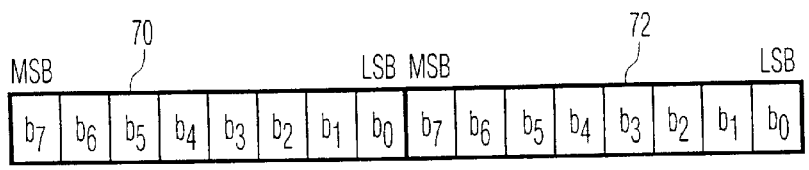
FIG. 9 shows the format of the data header portion in the sync block of FIG. 8.

FIG. 9 shows the two bytes 70 and 71 of the main header area 61 of FIG. 8. Only six bits, that is: the bits $b_0$ to $b_5$ of the byte 72 of the main header area 61, are available for storing a trick play sync block number TPSB#, although the TPSB# is expressed as a 7-bit number. The 6-bit number that can be stored in the six bits $b_0$ to $b_5$ of the byte 72 is denoted as RSB#.

Further, a trick play speed identifier is stored in the trick play sync blocks. The trick play speed identifier identifies the trick play speeds ±14x, ±12x and ±24x. A 2-bit word suffices for such identification. This 2-bit trick play speed identifier word is stored in the two remaining bits $b_6$ and b7 of the byte 72 FIG. 9. More specifically, the bit combination '00' indicates 4 times normal play, the bit combination '01' indicates 12 times normal play and the bit combination '10' indicates 24 times normal play.

In addition a direction identifier needs to be stored so as to distinguish between forward and backward trick play speeds. The byte 70, see FIG. 9, in the main header area 61, see FIG. 8, can be used for storing the direction identifier. More specifically, the 2-bit word $b_3,b_2$ comprise the direction identifier, such that the 2-bit word '10' means that the trick play sync block is meant for a trick play speed in the forward direction, whilst the 2-bit word '11' means that the trick play sync block is meant for a trick play speed in the reverse direction.

A further feature that should be discussed is the time stamping of trick play sync blocks. Time stamping is well known in the art. Reference is made in this respect to U.S. Pat. No. 5,579,183, document D1 in the list of related documents, and U.S. Pat. No. 5,953,483, corresponding to International Application WO 96/30.905, document D2 in the list of related documents. The documents describe the recording of MPEG packets on a record carrier, where time stamps are added to an MPEG packet upon arrival and the packet is subsequently recorded. Upon reproduction, the packet is read from the record carrier, the time stamp is retrieved from the packet and used for supplying the packet at the right moment to an output.

Figure 10:
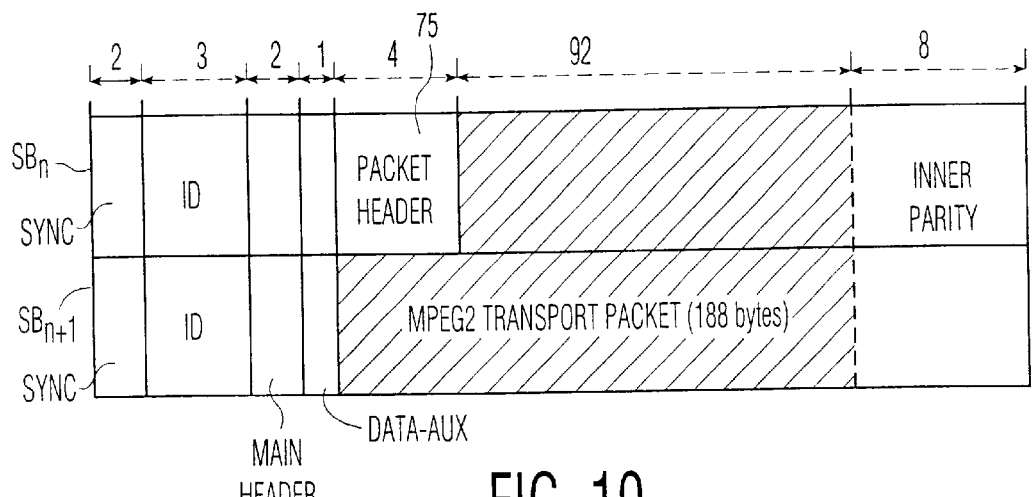
FIG. 10 shows two subsequent sync blocks in which an MPEG packet is stored.
Figure 11:
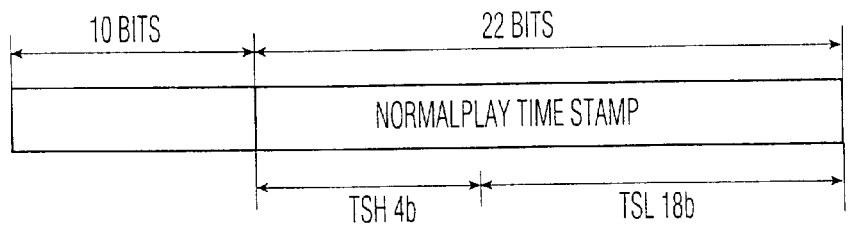
FIG. 11 shows contents of the packet header in the first of the two subsequent sync blocks FIG. 10, this packet header including the normal play time stamps.

FIG. 10 shows how an MPEG transport packet, which is 188 bytes long, is stored in two subsequent sync blocks, more specifically in the data area 64a of two subsequent sync blocks. First, a packet header 75, which is 4 bytes long, is stored in the data area 64a of the first of the two sync blocks, denoted $SB_n$. Next, 92 bytes of the MPEG packet are stored in the remaining portion of the data area 64a of sync block $SB_n$. The remaining 96 bytes of the MPEG packet are stored in the data area 64a of the second sync block $SB_{n+1}$. The time stamp corresponding to a transport packet is stored in the packet header 75. This is shown in FIG. 11. More precisely, the time stamp for 'normal play' data is 22 bits long and is stored in the last 22 bits of the packet header 75.

The 22-bit time stamp for the 'normal play' data has been divided into a TSL (time stamp low) portion and a TSH (time stamp high) portion. The TSL portion is 18 bits long and runs cyclically with a modulo value of 225,000, for an apparatus in which the head drum rotates with 1800 rpm, or with a modulo value of 225,225, for an apparatus in which the head drum rotates with 1800/1.001 rpm. The TSH portion is 4 bits long and runs cyclically with a modulo value of 12. Upon each return to 0 for TSL, the TSH value is increased by one.

A time stamp counter is available in the recording apparatus to be described later. For the generation of time stamps for the MPEG packets for a 'normal play' information signal, the time stamp counter has a period equal to six revolutions of the head drum. The time stamp counter generates, in the present example, the 22-bit time stamps in the form of count words with a clock frequency of 27 MHz.

Trick play information for a specific trick play speed can be obtained from an MPEG data stream by retrieving packets comprising I-frames, well known in the art, from the MPEG data stream, and storing those packets in the trick play sync blocks.

A time stamp counter, which can be the same counter as mentioned above, is available for the generation of time stamps for the MPEG packets for a trick play information signal. This time stamp counter has a period equal to one revolution of the head drum. The time stamp counter generates, in the present example, 20-bit count words with a clock frequency of 27 MHz. The time stamp for the trick play data is again made up of an 18-bit TSL (time stamp low) portion, identical to the TSL portion described above for the normal play time stamps, and a TSH' (time stamp high) portion. TSL runs cyclically with a modulo value of 225, 000, for an apparatus in which the head drum rotates with 1800 rpm, or with a modulo value of 225,225, for an apparatus in which the head drum rotates with 1800/1.001 rpm. The TSH' portion is 2 bits long and runs cyclically with a modulo value of 4. Upon each return to 0 for TSL, the TSH' value is increased by one. As a result, the period of TSL equals one quarter of a rotation of the head drum and the trick play time stamp counter is periodic with the one revolution of the head drum. The time stamp counter is synchronized with the head switch pulse, normally present in the apparatus.

The time stamp count values are, apart from the two most significant bits, the same for the normal play information as for the trick play information. Thus, the same time stamp counter can be used during reproduction for reproducing the normal play information during a normal play reproduction mode as well as for reproducing trick play information in a trick play reproduction mode.

Figure 12:
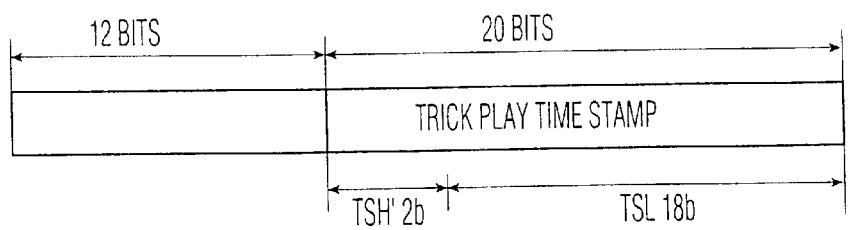
FIG. 12 shows the contents of the packet header in the first of the two subsequent trick play sync blocks FIG. 10, this packet header including the time stamps for packets in a trick play data stream of packets.

The 2bit time stamp is stored in the packet header 75 of the first of two subsequent trick play sync blocks in which the MPEG packet corresponding to this time stamp is stored, see FIG. 12.

A transport packet for storing in two subsequent trick play sync blocks thus has a time stamp and the two subsequent trick play sync blocks in which the transport packet is stored have corresponding trick play sync block numbers that relate to the position in the tracks where those trick play sync blocks are recorded.

From the time stamp added to the transport packet, a nominal trick play sync block number for the transport packet is derived, using the following equation:

$$NTPSB\# = int[(k+n/N).102/4],$$

where NTPSB# is the nominal trick play sync block number, N is a constant which equals 225,000 in a recording apparatus in which the rotating head drum rotates with 1800 rpm and equals 225,225 in a recording apparatus in which the rotating head drum rotates with 1800/1.001 rpm, n equals the decimal value of TSL and k is the decimal value of TSH'.

Next. the packet is stored in two subsequent trick play sync blocks and recorded in a specific position in one or two tracks on the record carrier. This position corresponds to an actual trick play sync block number, denoted ATPSB#, which is stored in those trick play sync blocks.

The relation between the actual trick play sync block number ATPSB# of a trick play sync block and the nominal trick play sync block number NTPSB# derived for that block is now as follows:

$$NTPSB\# - 51 < ATPSB\# \leq NTPSB\# + 51.$$

In this way, it is guaranteed that the position where a trick play sync block including part of a trick play packet is recorded in the tracks on the record carrier during one revolution of the head drum is not too far away from the position where it optimally should have been recorded, so that the buffer memory for storing the packets read from the record carrier upon reproduction need not be too large. The above formula makes clear that a trick play sync block comprising part of a trick play packet is recorded in the same track as the nominal position or in a track earlier or later. But, even when recorded in an earlier or a later track, it is assured that the trick play block is shifted back to its correct position, viewed in time, upon reproduction. The original position on the time axis of the packets can now uniquely regained upon reproduction.

The formula given above is valid for all the trick play information signals recorded on the record carrier, where it should be noted that, when ATPSB# is chosen smaller than 0, this means that the trick play sync block having the trick play sync block ATPSB#+102 is recorded during the previous revolution of the head drum, while, when ATPSB# is chosen larger than 101, this means that the trick play sync block having the trick play sync block number ATPSB-102 is recorded during the subsequent revolution of the head drum.

Figure 13:
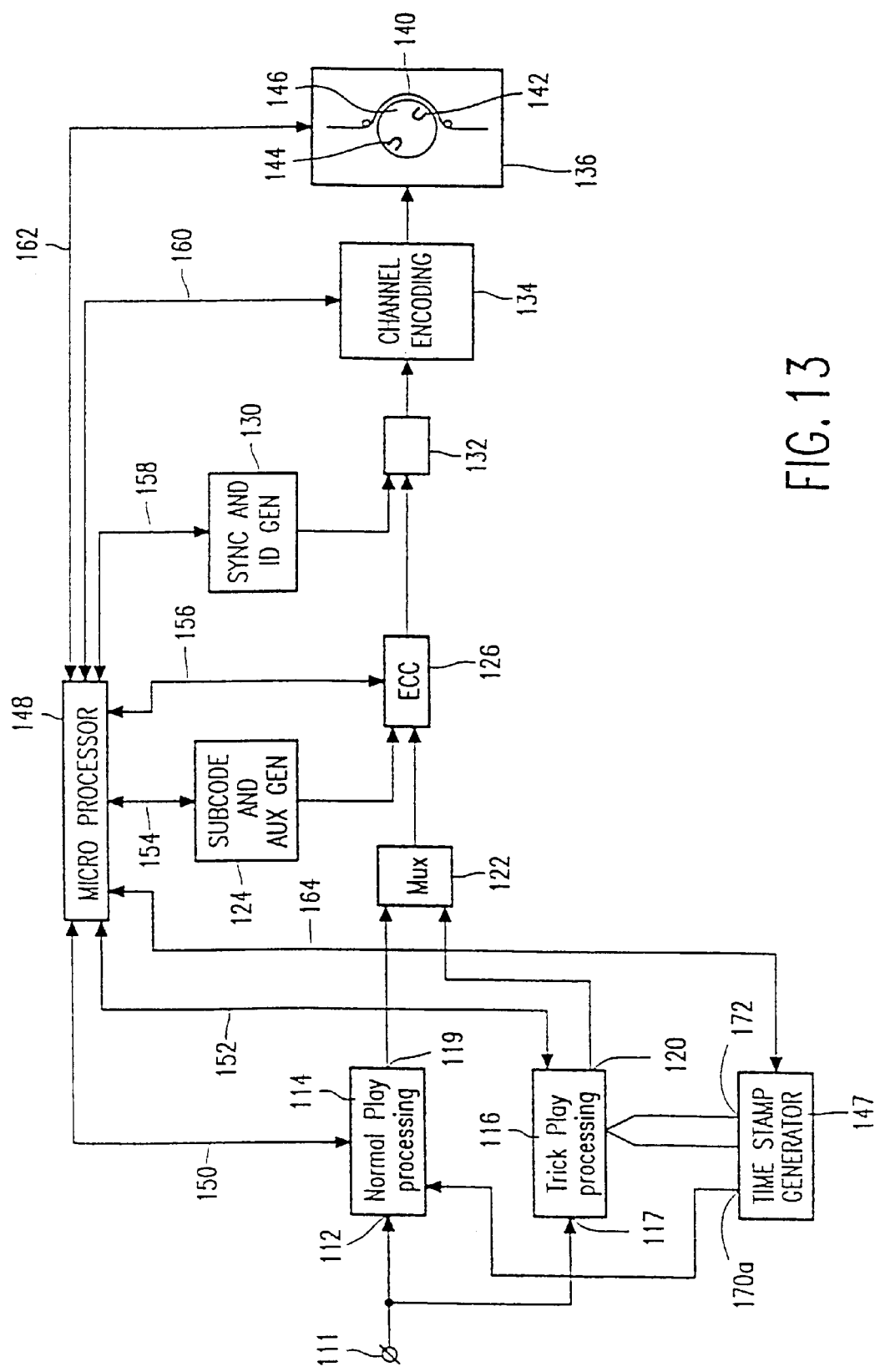
FIG. 13 shows an embodiment of a recording apparatus in accordance with the invention.

Next, an apparatus of the helical scan type, for recording the trick play information on a longitudinal record carrier, is described. FIG. 13 shows the recording apparatus which comprises an input terminal 111 for receiving a video signal and a corresponding audio signal. The video signal and the corresponding audio signal may have been encoded into transport packets included in an MPEG serial datastream, well known in the art. The input terminal 111 is coupled to an input 112 of a 'normal play' processing unit 114. Further, a 'trick play' processing unit 116 is provided having an input 117 also coupled to the input terminal 111. Outputs 119 and 120 of the 'normal play' processing unit 114 and the 'trick play' processing unit 116 are coupled to corresponding inputs of a multiplexer 122. The 'normal play' information as well as the 'trick play' information will be recorded in the main area recording portion 12 of the track shown in FIG. 2.

For a further description of the 'normal play' processing unit 114 and the 'trick play' processing unit 116, reference is made to U.S. Pat. No. 5,579,183, document D1 in the list of related documents.

A subcode and auxiliary signal generator 124 is present for supplying the subcode signal information for storage in the subcode signal recording portion 4, and for supplying the auxiliary signal for storage in the auxiliary signal recording portion 8, see FIG. 2. Outputs of the multiplexer 122 and the generator 124 are coupled to corresponding inputs of an error correction encoder unit 126. The error correction encoder unit 126 is capable of carrying out a error correction encoding step on the 'normal play' (video and audio) information and the trick play information, so as to obtain the parity information shown in the portion 12b of the main signal recording portion 12 in FIG. 2, and in the portions 64b of the sync blocks, see FIG. 8.

The recording apparatus further comprises a generator 130 for adding the sync and ID information for the sync blocks, such as shown in FIG. 8. After combination of the signals in the combining unit 132, the combined signal is applied to a unit 134, in which a channel encoding is carried out on the composite signal. The channel encoding carried out in the encoding unit 134 is well known in the art. For an example of such channel coding, reference is made in this respect to U.S. Pat. No. 5,142,421, document D3 in the list of references.

An output of the channel encoding unit 134 is coupled to an input of a writing unit 136, in which the datastream obtained with the encoding unit 134 is recorded in the slant tracks on a record carrier 140, by means of at least two write heads 142 and 144 positioned on a rotating head drum 146. The write heads 142 and 144 have head gaps with a mutually different azimuth angle, so that (e.g.) the write head 142 write the tracks having an azimuth angle from bottom left to top right in FIG. 1 and the write head 144 writes the tracks having an azimuth angle from top left to bottom right in FIG. 1. Further, a time stamp generator 147 is available for generating time stamps for the normal play processing unit 114 and the tick play processing unit 116.

A microprocessor unit 148 is present for controlling the functioning of the various blocks, such as:

the control of the normal play signal processing block 114 via the control connection 150, the control of the trick play signal processing block 116 via the control connection 152, the control of the subcode signal and auxiliary signal generator block 124 via the control connection 154, the control of the error correction encoding block 126 via the control connection 156, the control of the sync signal and ID signal generator block 130 via the control connection the control of the channel encoding block 134 via the control connection 160, the control of the transport velocity of the record carrier 140 and the rotation of the head drum 146, via the control connection 162, and the control of the time stamp generator 147 via the control connection 164.

The trick play processing 116 is adapted to retrieve I-frame information from the first information signal, in a way well known in the art. An additional error correction encoding step is carried out in the processing unit 116 on the trick play information in order to generate the 10 trick play sync blocks comprising the parity information for the various trick play speeds. Further, repetitions of trick play sync blocks are generated for the +12×, −12×, +24× and −24× trick play information signals.

Further, for each trick play information signal, trick play sync blocks are generated, in the sense that for each trick play sync block the trick play speed identifier and the direction identifier are generated and stored in the trick play sync block at the location described above, and a time stamp is added to each packet in the various trick play information signals. Further, information of a transport packet is stored in a trick play sync block having a trick play sync block number satisfying the relationship for ATPSB# given above.

Next, the trick play sync blocks and the 'normal play' sync blocks, generated by the normal play signal processing unit 114, are combined in the multiplexer unit 122, such that, for recording information in one complete track by one of the heads, the sequence of sync blocks of the normal play information and the trick play information is such that the main data area 12 of one of the 48 tracks shown in FIG. 1 can be created.

Subcode data and auxiliary data are added and an error correction encoding is carried out on the combined normal play data and trick play data so as to obtain the parity information for the track portion 12b. Further, sync words and identification information are added. Next, a channel encoding step is carried out on the information prior to recording the information in the tracks.

It should be noted that, upon recording groups of 48 subsequent tracks, two tracks in each group, that are the first and the last one shown in FIG. 1, are devoid of any trick play segments. This enables the possibility to realize editing, where the edit points can be chosen exactly at the location of the two tracks that have no trick play segments recorded in them.

Figure 14:
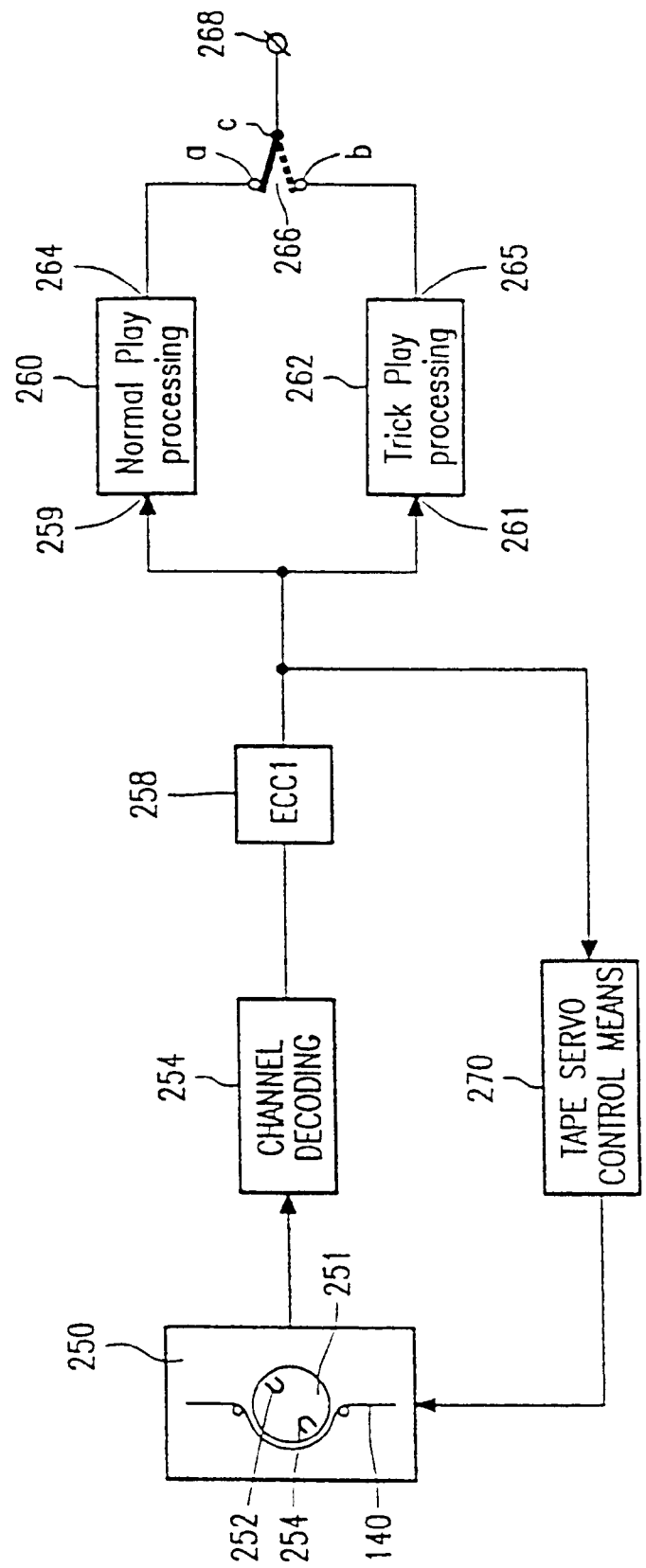
FIG. 14 shows an embodiment of a reproduction apparatus.

FIG. 14 shows schematically an embodiment of a reproduction apparatus for reproducing information from the record carrier 140 obtained with the recording apparatus of FIG. 13. The reproduction apparatus comprises a reading unit 250, having at least two reading heads 252 and 254, for reading information from the slant tracks on the record carrier 140. The one read head has a gap with an azimuth angle which equals the azimuth angle of the write head 142 and the other read head has a gap with an azimuth angle which equals the azimuth angle of the write head 144. An output of the reading unit 250 is coupled to an input of a channel decoding unit 254. The channel decoding unit may be adapted to carry out a 25-to-24 decoding on the signal read out, so as to convert 25-bit words in the incoming datastream into 24-bit words, such as disclosed in document D3. Next, an error correction is carried out in the error correction unit 258.

The error correction unit 258 is used for carrying out an (inner) error correction step on the information read from the record carrier in the 'normal play' as well as in a 'trick play' reproduction mode, on the basis of the inner parity information stored in the portions 64b of the sync blocks, see FIG. 8.

The output of the error correction unit 258 is coupled to an input 259 of a 'normal play' processing unit 260. Further, a 'trick play' processing unit 262 is provided having an input 261 also coupled to the output of the error correction unit 258. Outputs 264 and 265 of the 'normal play' processing unit 260 and the 'trick play' processing unit 262 respectively, are coupled to corresponding terminals a and b respectively, of a switch 266, a c-terminal of which is coupled to an output terminal 268.

The processing unit 260 comprises a circuit part capable of carrying out an outer error correction step on the information supplied by the error correction unit 258 in the normal play reproduction mode, using the outer parity information comprised in the track portion 12b, see FIG. 2. The processing unit 262 comprises a circuit part capable of carrying out an error correction step on the information supplied by the error correction unit 258 in the trick play reproduction mode, using the trick play sync blocks comprising parity information, as well as the repetitions of the sync blocks in the trick play segments. The error correction step in the processing units 260 and 262 using the parity information is the same for both modes: the normal play reproduction mode as well as a trick play reproduction mode. Therefore, the processing units 260 and 262 can share the error correction circuit for carrying out this error correction step. If the reproducing apparatus is switched into a 'normal play' reproduction mode, this means that the record carrier 140 is transported at a nominal speed, that the 'normal play' processing unit 260 is enabled, and the switch 266 is switched into the position a-c. If the reproducing apparatus is switched into a 'trick play' reproduction mode, also called 'feature mode', this means that the record carrier 140 is transported at a speed other than the nominal speed, that the 'trick play' processing unit 262 is enabled, and the switch 266 is switched into the position b–c.

For enabling a 'trick play' reproduction mode, the reproducing apparatus is further provided with a tape servo control means 270 which generates a control signal for controlling the speed of the record carrier 140. More specifically, the control means 270 generates a control signal during the 'trick play' reproduction mode for transporting the record carrier 140 such that, in the first trick play mode with the record carrier speed being +4 times the nominal reproduction speed, in accordance with FIG. 1, the read head 252 crosses the tracks in accordance with the line 24, and the read head 254 crosses the tracks in accordance with the line 26 in FIG. 1.

In the second trick play reproduction mode, with the record carrier speed being −4 times the nominal reproduction speed, the control means 270 generates a control signal such that, in accordance with FIG. 3, the head 252 crosses the tracks in accordance with the line 30, and the read head 254 crosses the tracks in accordance with the line 32 in FIG. 3.

In the third trick play reproduction mode, with the record carrier speed being +12 times the nominal reproduction speed, the control means 270 generates a control signal such that, in accordance with FIG. 4, the read head 252 crosses the tracks in accordance with the line 36, and the read head 254 crosses the tracks in accordance with the lines 37 in FIG. 4.

In the fourth trick play reproduction mode, with the record carrier speed being −12 times the nominal reproduction speed, the control means 270 generates a control signal such that, in accordance with FIG. 5, the read head 252 crosses the tracks in accordance with the line 42, and the read head 254 crosses the tracks in accordance with the line 44 in FIG. 5.

In the fifth trick play reproduction mode, with the record carrier speed being +24 times the nominal reproduction speed, the control means 270 generates a control signal such that, in accordance with FIG. 6, the read heads 252 crosses the tracks in accordance with the line 50, and the read head 254 crosses the tracks in accordance with the line 51 in FIG. 6.

In the sixth trick play reproduction mode, with the record carrier speed being −24 times the nominal reproduction speed, the control means 270 generates a control signal such that, in accordance with FIG. 7, the read head 252 crosses the tracks in accordance with the line 56, and the read head 254 crosses the tracks in accordance with the line 58 in FIG. 7.

The record carrier transport control realized in the way explained above is named: track select transport control, in the sense that specific paths across the record carrier are selected for reproduction in a trick play reproduction mode, said paths beginning at specific tracks on the record carrier. Further, those paths are chosen such that at least one of the two read heads is capable of reading the subcode information recorded in the recording portions 4 of the tracks. In FIG. 1, this is the read head following the path 24. The read head following the path 26 is not capable of reading the subcode recording portions 4, as it scans the subcode recording portions of tracks having the wrong azimuth. In FIG. 3, this is the read head following the path 30. The read head following the path 32 is not capable of reading the subcode recording portions 4, as it scans the subcode recording portions of tracks having the wrong azimuth. In FIG. 4, this is the head following the path 36. The read head following the path 37 is not capable of reading the subcode recording portions 4, as it scans the subcode recording portions of tracks having the wrong azimuth. In FIG. 5, this is the read head following the path 42. The head following the path 44 is not capable of reading the subcode recording portions 4, as it scans the subcode recording portions of tracks having the wrong azimuth. In FIG. 6, this is the read head following the path 50. The read head following the path 51 is not capable of reading the subcode recording portions 4, as it scans the subcode recording portions of tracks having the wrong azimuth. In FIG. 7, this is the read head following the path 56. The read head following the path 58 is not capable of reading the subcode recording portions 4, as it sums the subcode recording portions of tracks having the wrong azimuth.

The reproduction in a trick play reproduction mode will now be explained in more detail. During trick play reproduction, bursts of information of 'normal play' data and bursts of information of 'trick play' are read by the two read heads during one revolution of the head drum. Not complete 'normal play' data is ignored and, as far as complete 'normal play' sync blocks are read, those sync blocks are identified by their identifier (the bits $b_3,b_2$ in byte 70 equal '00', see FIG. 9), as being 'normal play' data, and thus also ignored.

As soon as a sync block is read, having a trick play speed identifier which is stored in the two remaining bits $b_7,b_6$ of the byte 72 in FIG. 9, which corresponds to the trick play reproduction speed in question, and further, the direction identifier identifies a trick play speed in the forward direction (the bits $b_3,b_2$ of the byte 72 in FIG. 9 being equal to '10'), the sync block read is detected as being a trick play sync block for the trick play speed in question and supplied to the error correction unit 258, in which the inner error correction step is carried out on the information stored in the trick play sync blocks, using the inner parity information, stored in the portion 64b, see FIG. 8, of the trick play sync blocks. Next, the corrected information is stored in the trick play processing unit 262 for further processing.

For all the trick play reproduction speeds, the parity information stored in the parity trick play sync blocks read from the record carrier during one revolution of the head drum, is used to carry out an ECC2 (or outer error correction) on the trick play data retrieved from the record carrier during that same revolution of the head drum. For the +12, −12, +24 and −24 reproduction speeds moreover the repetitions of the trick play sync blocks are used to carry out an error correction on the reproduced data.

The trick play sync block numbers for each of the trick play sync blocks can be derived from the RSB# stored in the 6 bits $b_0$ to $b_5$ of the byte 72, in the way as explained above, using the knowledge about which read head is in reproducing contact with the record carrier. When having derived the trick play sync block numbers, those numbers are used to store the trick play sync blocks in specific memory locations in a processing memory included in the processing unit 262.

It should be noted here that the use of the trick play sync block numbers is preferred over the use of the sync block numbers for storing the trick play sync blocks in the processing memory. The trick play sync block numbers directly relate to the memory locations in the said processing memory in which the trick play sync blocks are to be stored. Using the sync block numbers instead, would require a conversion table to convert the sync block numbers into the corresponding trick play sync block numbers in order to store the trick play sync blocks at their correct location in the processing memory. This conversion table thus has to be stored in the reproducing apparatus. Such conversion table, however, would prevent the recording/reproducing system described from being 'forward compatible', in the sense that, if another correspondence between sync block numbers and trick play sync block numbers were chosen in a new version of the recording/reproducing system, such would make the older system and the tapes obtained with the older system useless in the new system.

Further, by using the trick play sync block numbers, the recording of the trick play sync blocks on the record carrier becomes more flexible, as a trick play sync block having a specific trick play sync block number can be stored at a variable position in a track on the record carrier. By varying this position, the sync block number will change. The trick play sync block number will not, so that upon reproduction, irrespective of where the trick play sync block is stored in the track, it will be stored at the correct location in the processing memory. In addition, no memory space is required for storing the conversion table and for carrying out the conversion.

The trick play packets can now be retrieved from each two subsequent trick play sync blocks. The time stamps for each packet of the trick play information signal are derived from the packet header 75, see FIG. 10.

In the processing unit 262, the time stamps derived from each of the packets is compared to a reference time stamps generated by a reference time stamp counter included in the processing unit 262 with a 27 MHz frequency. Upon coincidence of the value of the time stamp of a packet with the value of the time stamp generated by the reference time stamp counter, the packet is outputted at the output 265, so as to obtain a valid MPEG transport stream at the output terminal 268. An MPEG decoder may be included in the apparatus. coupled to the terminal 286, or may be separate from the apparatus.

While the invention has been described with reference to preferred embodiments thereof, it is to be understood that these are not limitative examples. Thus, various modifications may become apparent to those skilled in the art, without departing from the scope of the invention, as defined by the claims. The first information signal thus may be another type of signal than a digital video signal and/or an audio signal, such as a data signal. Further, the trick play signal recorded in the trick play segments could be an information signal which has no relationship whatsoever with the first digital information signal. In such an embodiment, the record carrier is a recording medium on which a multiplicity of transmission channels are available for transmitting independent information signals.

Further, the invention lies in each and every novel feature or combination of features.

The advantages of the recording/reproducing system described above can be summarized as follows:

1. A fixed number of trick play sync blocks are read from the record carrier during one revolution of the head drum in a trick play reproduction mode: in the present example, 102 trick play sync blocks.
2. The format obtained enables the reading of the subcode in a trick play reproduction mode.
3. As many as possible data burst are present and divided over the two scans of both read heads in one revolution of the head drum.
4. The trick play segments are as short as possible so as to obtain a robust trick play reproduction.
5. The format is repetitive in groups of (p=) 48 tracks and is chosen such that editing can be realized, for the reason that at least one of the tracks in the group of 48 tracks is devoid of trick play information.
6. An optimal position of the segments with respect to the ideal scanning line of a reproduction head can be obtained.
7. An optimal robustness against tracking errors and missing trick play sync blocks is obtained.

It should be made very well clear that the invention should not be restricted to the specific trick play reproduction speeds described in the figure description. E.g. trick play speeds 6×, 18× and 36× in forward and backwards direction could have been chosen, combined with trick play information recorded in groups of (p=) 72 tracks. Further, the invention need not be restricted to the recording of video data. One could imagine to use the invention in an audio recording system, based on the helical scan principle, where different audio signals are recorded in the trick play segments for the various trick play speeds.

RELATED DOCUMENTS

D1 U.S. Pat. No. 5,579,183, corresponding to European Patent Application EP 702,877-A2 (PHN 14.818)
D2 U.S. Pat. No. 5,953,483, corresponding to WO 96/30.905-A2 (PHN 51.260)
D3 U.S. Pat. No. 5,142,421, (PHN 13.537)
D4 U.S. Pat. No. 5,751,889, corresponding to WO95/28061 (PHN 14.832)

What is claimed is:

1. A record carrier having first and second trick play signals, formed from first and second digital information signals, recorded at specific positions in slant tracks, the first digital information signal enabling replay in a reproduction apparatus at a trick play reproduction speed which equals $n_1$ times the recording speed, and the second digital information signal enabling replay in said reproduction apparatus at a trick play reproduction speed which equals $n_2$ times the recording speed, where $n_1$ and $n_2$ are integers unequal to each other and unequal to 0 and 1, characterized in that the first and second trick play signals comprise sync blocks of information of the first and second digital information signals, respectively, the sync blocks of the first trick play signal being written into first trick play segments, a first trick play segment comprising at least one sync block of the first trick play signal and at least one repetition of said at least one sync block, and the sync blocks of the second trick play signal being written into second trick play segments, enabling, during reproduction at said trick play speed $n_1$ times the recording speed, reading of $m_1$ sync blocks of the first trick play signal from first trick play segments during one revolution of a head drum of a reproduction apparatus, and enabling, during reproduction at said trick play speed $n_2$ times the recording speed, reading of $m_1$ sync blocks of the second trick play signal from second trick play segments during one revolution of the head drum, where $m_1$ is an integer larger than 1, said first trick play segments being written in said tracks to enable a first read head of the reproduction apparatus to read at least one first trick play segment and a second read head of the reproduction apparatus to read at least one other first trick play segment during said one revolution of the head drum during reproduction at said trick play speed $n_1$ times the recording speed.

* * * * *